United States Patent
Yano et al.

(10) Patent No.: US 10,609,233 B2
(45) Date of Patent: Mar. 31, 2020

(54) INFORMATION PROCESSING APPARATUS AND SETTING METHOD

(71) Applicant: CANON KABUSHIKI KAISHA, Tokyo (JP)

(72) Inventors: Takaaki Yano, Tokyo (JP); Satoshi Yoshida, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/819,581

(22) Filed: Nov. 21, 2017

(65) Prior Publication Data
US 2018/0152572 A1 May 31, 2018

(30) Foreign Application Priority Data

Nov. 29, 2016 (JP) .................................. 2016-230825

(51) Int. Cl.
*H04N 1/00* (2006.01)

(52) U.S. Cl.
CPC ..... *H04N 1/00506* (2013.01); *H04N 1/00435* (2013.01); *H04N 1/00623* (2013.01); *H04N 2201/0094* (2013.01)

(58) Field of Classification Search
CPC ........... H04N 1/00506; H04N 1/00435; H04N 1/00623; H04N 2201/0094
USPC ........................................ 358/1.15, 1.9, 448
See application file for complete search history.

(56) References Cited

U.S. PATENT DOCUMENTS

| | | | | |
|---|---|---|---|---|
| 2002/0041386 A1* | 4/2002 | Suzuki | ............... | H04N 1/00411 358/1.13 |
| 2003/0039482 A1 | 2/2003 | Kishi | | |
| 2005/0141007 A1* | 6/2005 | Shirai | ................... | G06F 3/0486 358/1.13 |
| 2009/0009803 A1* | 1/2009 | Takeuchi | ........... | H04N 1/00408 358/1.15 |
| 2010/0007905 A1* | 1/2010 | Murashita | ............. | G06F 3/1205 358/1.13 |
| 2011/0135322 A1 | 6/2011 | Masuyama | | |

FOREIGN PATENT DOCUMENTS

| | | |
|---|---|---|
| CN | 1837968 A | 9/2006 |
| CN | 101334714 A | 12/2008 |
| CN | 104954610 A | 9/2015 |

(Continued)

*Primary Examiner* — Quang N Vo
(74) *Attorney, Agent, or Firm* — Canon U.S.A., Inc. IP Division

(57) ABSTRACT

An information processing apparatus capable of communicating with an image forming apparatus that performs printing using a sheet set in a feeding unit includes a controller serving as a processor that executes a program or a circuit that is equipped with functions, the controller being configured to function as a unit that causes a display device to display a screen in which a plurality of objects corresponding to a plurality of pieces of attribute information is arranged, a unit that sets, in the screen, attribute information corresponding to a sheet set in the feeding unit, a unit that updates, according to setting of the attribute information, count information associated with the set attribute information, and a unit that determines an arrangement of the plurality of objects in the screen based on the count information.

16 Claims, 26 Drawing Sheets

(56) References Cited

FOREIGN PATENT DOCUMENTS

| | | |
|---|---|---|
| CN | 105235399 A | 1/2016 |
| CN | 105279864 A | 1/2016 |
| JP | 2003-186659 A | 7/2003 |
| JP | 5448765 B2 | 3/2014 |
| JP | 2016-144908 A | 8/2016 |
| JP | 2017-10522 A | 1/2017 |

* cited by examiner

FIG.6

| PAPER TYPE | SIZE | TRAY 1 | TRAY 2 | TRAY 3 | TRAY 4 | TRAY 5 | TRAY 6 | TRAY 7 | TRAY 8 |
|---|---|---|---|---|---|---|---|---|---|
| PLAIN PAPER | A5 | ○ | ○ | ○ | ○ | ○ | ○ | ○ | ○ |
| | B5 | ○ | ○ | ○ | ○ | ○ | ○ | ○ | ○ |
| | A4 | ○ | ○ | ○ | ○ | ○ | ○ | ○ | ○ |
| | B4 | ○ | ○ | ○ | ○ | ○ | ○ | ○ | ○ |
| | A3 | ○ | ○ | × | ○ | ○ | ○ | ○ | ○ |
| | B3 | ○ | ○ | × | ○ | ○ | ○ | ○ | ○ |
| RECYCLED PAPER | A5 | ○ | ○ | ○ | ○ | ○ | ○ | ○ | ○ |
| | B5 | ○ | ○ | ○ | ○ | ○ | ○ | ○ | ○ |
| | A4 | ○ | ○ | ○ | ○ | ○ | ○ | ○ | ○ |
| | B4 | ○ | ○ | ○ | ○ | ○ | ○ | ○ | ○ |
| | A3 | ○ | ○ | × | ○ | ○ | ○ | ○ | ○ |
| | B3 | ○ | ○ | × | ○ | ○ | ○ | ○ | ○ |
| HEAVY PAPER | A5 | × | × | ○ | ○ | ○ | ○ | ○ | ○ |
| | B5 | × | × | ○ | ○ | ○ | ○ | ○ | ○ |
| | A4 | × | × | ○ | ○ | ○ | ○ | ○ | ○ |
| | B4 | × | × | ○ | ○ | ○ | ○ | ○ | ○ |
| | A3 | × | × | × | ○ | ○ | ○ | ○ | ○ |
| | B3 | × | × | × | ○ | ○ | ○ | ○ | ○ |
| ONE-SIDED COATED PAPER | A5 | × | × | ○ | ○ | ○ | ○ | ○ | ○ |
| | B5 | × | × | ○ | ○ | ○ | ○ | ○ | ○ |
| | A4 | × | × | ○ | ○ | ○ | ○ | ○ | ○ |
| | B4 | × | × | ○ | ○ | ○ | ○ | ○ | ○ |
| | A3 | × | × | × | ○ | ○ | ○ | ○ | ○ |
| | B3 | × | × | × | ○ | ○ | ○ | ○ | ○ |

FIG.7B

TOP SCREEN — 401

DEVICE (403) | ADJUSTMENT (404)

- IMAGE POSITION ADJUSTMENT — NO ADJUSTMENT
- CURL CORRECTION — NO ADJUSTMENT
- ADJUSTMENT OF SADDLE FOLDING POSITION — 0 mm
- ADJUSTMENT OF CREEP CORRECTION AMOUNT — 0 mm
- ADJUSTMENT OF SADDLE STITCH FOLDING POSITION — 0 mm
- CHANGE OF SADDLE STITCH POSITION — NO ADJUSTMENT
- ADJUSTMENT OF SECONDARY TRANSFER VOLTAGE — NO ADJUSTMENT
- ADJUSTMENT OF LEADING EDGE PORTION SECONDARY TRANSFER VOLTAGE — NO ADJUSTMENT
- ADJUSTMENT OF SECONDARY TRANSFER DESTATICIZING BIAS — NO ADJUSTMENT
- ADJUSTMENT OF PRIMARY TRANSFER VOLTAGE — NO ADJUSTMENT
- ADJUSTMENT OF GLOSSINESS/BLACK QUALITY — NO ADJUSTMENT

417 — 402 — 414 — 418

415

| NAME SIZE | GRAMMAGE |
|---|---|
| PLAIN PAPER A4 | 100 gsm |
| TWO-SIDED COATED PAPER A4 | 105 gsm |
| ONE-SIDED COATED PAPER A4 | 105 gsm |
| OHP PAPER A4 | 80 gsm |
| RECYCLED PAPER A4 | 200 gsm |
| TRANSPARENT PAPER A4 | 80 gsm |
| COLORED PAPER A4 | 127 gsm |
| HEAVY PAPER A4 | 300 gsm |
| ONE-SIDED COATED PAPER A4 | 105 gsm |
| OHP PAPER A4 | 80 gsm |
| RECYCLED PAPER A4 | 200 gsm |

| PAPER INFORMATION | TRAY 1 | TRAY 2 | TRAY 3 | TRAY 8 | TOTAL |
|---|---|---|---|---|---|
| PLAIN PAPER A4 | 26 | 3 | 6 | 2 | 61 |
| PLAIN PAPER A3 | 4 | 53 | 0 | 7 | 130 |
| HEAVY PAPER A4 | 0 | 0 | 2 | 1 | 27 |
| HEAVY PAPER A3 | 0 | 0 | 0 | 11 | 21 |
| RECYCLED PAPER A4 | 6 | 1 | 22 | 6 | 43 |
| RECYCLED PAPER A3 | 6 | 18 | 0 | 21 | 98 |
| USER-DEFINED PAPER A  A4 | 18 | 0 | 2 | 1 | 29 |
| USER-DEFINED PAPER B  A3 | 2 | 3 | 0 | 3 | 15 |
| ... | | | | | |
| ... | | | | | |

FIG.11A

| # | PAPER INFORMATION |
|---|---|
| 1 | PLAIN PAPER A3 |
| 2 | RECYCLED PAPER A3 |
| 3 | PLAIN PAPER A4 |
| 4 | RECYCLED PAPER A4 |
| 5 | USER-DEFINED PAPER A  A4 |
| 6 | HEAVY PAPER A4 |
| 7 | HEAVY PAPER A3 |
| 8 | USER-DEFINED PAPER B  A3 |
| ... | ... |
| ... | ... |

FIG.11B

| # | PAPER INFORMATION |
|---|---|
| 1 | PLAIN PAPER A4 |
| 2 | RECYCLED PAPER A4 |
| 3 | USER-DEFINED PAPER A  A4 |
| 4 | RECYCLED PAPER A3 |
| 5 | HEAVY PAPER A4 |
| 6 | PLAIN PAPER A3 |
| 7 | USER-DEFINED PAPER B  A3 |
| 8 | HEAVY PAPER A3 |
| ... | ... |
| ... | ... |

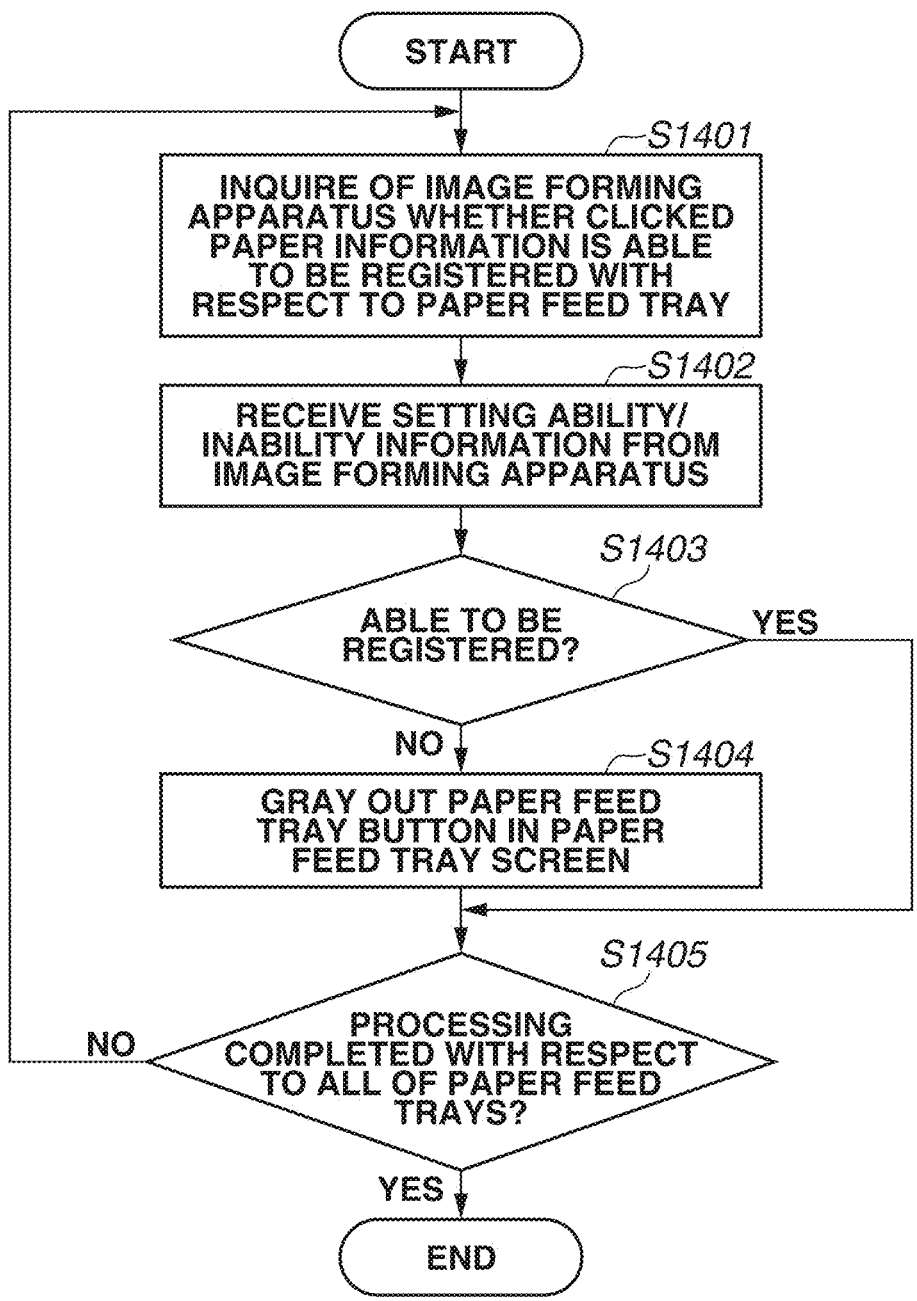

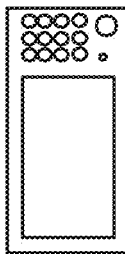

SETTING WITH RESPECT TO DISPLAYING OF PAPER LIST

SPECIFY DISPLAY ORDER IN PAPER LIST.

- NAME
- REGISTRATION
- GRAMMAGE
- NUMBER OF TIMES OF REGISTRATION
- NUMBER OF PRINTED SHEETS

[CANCEL] [OK]

INFORMATION PROCESSING APPARATUS AND SETTING METHOD

BACKGROUND OF THE INVENTION

Field of the Invention

Aspects of the embodiments generally relate to an information processing apparatus and a setting method each of which enables selecting paper that is used for printing.

Description of the Related Art

There is a print control apparatus which is equipped with a plurality of paper feed trays and is capable of performing printing with various types of paper set therein. Such a print control apparatus stores, as a paper database, information about, for example, types or grammages of paper used by a printing apparatus. Then, when setting paper in a paper feed tray, the operator selects paper information from a list of pieces of paper information registered with the paper database and registers the selected paper information in association with the paper feed tray in which to set the paper. This enables determining, for example, whether to perform printing using the paper set in which paper feed tray in conformity with setting information about entered print data.

It is known that, when registering paper information with respect to a paper feed tray, the operator can cause paper information that was previously registered with respect to the paper feed tray to be displayed as a history and can register paper information based on the history. Japanese Patent No. 5,448,765 discusses an image forming apparatus which displays, on a screen, a history about a paper feed tray selected by the operator and allows the operator to select paper information to be currently registered with respect to the paper feed tray based on the history and then register the selected paper information.

Furthermore, the paper information includes paper information the number of times which the operator registers with respect to the paper feed tray is large and paper information the number of times which the operator registers with respect to the paper feed tray is small. For example, the paper information the number of times which the operator registers with respect to the paper feed tray is large is paper information about paper that is used for a printed product a manuscript of which is periodically entered, such as a weekly magazine or monthly magazine. During a period from when such paper information is once registered with respect to a paper feed tray to when the same paper information is next registered with respect to the same paper feed tray, a different piece of paper information may be registered with respect to the same paper feed tray. Then, when the operator has caused the history to be displayed for the purpose of registering the paper information the number of times which the operator registers with respect to the paper feed tray is large, the different piece of paper information would be displayed at a portion upper than the same paper information. The operator has to search for the paper information the number of times which the operator registers with respect to the paper feed tray is large from among the history. In this way, searching a list containing paper information the number of times of registration of which with respect to the paper feed tray is large and paper information the number of times of registration of which with respect to the paper feed tray is small may be time-consuming.

SUMMARY OF THE INVENTION

According to an aspect of the embodiments, an information processing apparatus capable of communicating with an image forming apparatus that performs printing using a sheet set in a feeding unit includes a controller serving as a processor that executes a program or a circuit that is equipped with functions, the controller being configured to function as a unit that causes a display device to display a screen in which a plurality of objects corresponding to a plurality of pieces of attribute information is arranged, a unit that sets, in the screen, attribute information corresponding to a sheet set in the feeding unit, a unit that updates, according to setting of the attribute information, count information associated with the set attribute information, and a unit that determines an arrangement of the plurality of objects in the screen based on the count information.

Further features of the disclosure will become apparent from the following description of exemplary embodiments with reference to the attached drawings.

BRIEF DESCRIPTION OF THE DRAWINGS

FIG. 6 is a schematic diagram illustrating an example of a correspondence table between types of paper and paper feed trays, which is stored in the image forming apparatus.

FIGS. 7A and 7B are diagrams each illustrating an example of a top screen of a paper management application in a first exemplary embodiment.

FIG. 10 is a diagram illustrating an example of paper registration history information, which is stored in the print control apparatus.

FIGS. 11A and 11B are diagrams each illustrating an example of a paper list, which a paper list generation unit of the print control apparatus generates.

FIG. 14 is a flowchart illustrating processing performed at the time of registering paper information with respect to a paper feed tray, which the print control apparatus performs in the first exemplary embodiment.

FIGS. 15A, 15B, 15C, and 15D are diagrams each illustrating an example of a screen displayed on a display device at the time of registering paper information with respect to a paper feed tray.

FIG. 22 is a diagram illustrating an example of a screen used to perform setting with respect to displaying of a paper list in an eighth exemplary embodiment.

DESCRIPTION OF THE EMBODIMENTS

Various exemplary embodiments, features, and aspects of the disclosure will be described in detail below with reference to the drawings.

Figure 1:
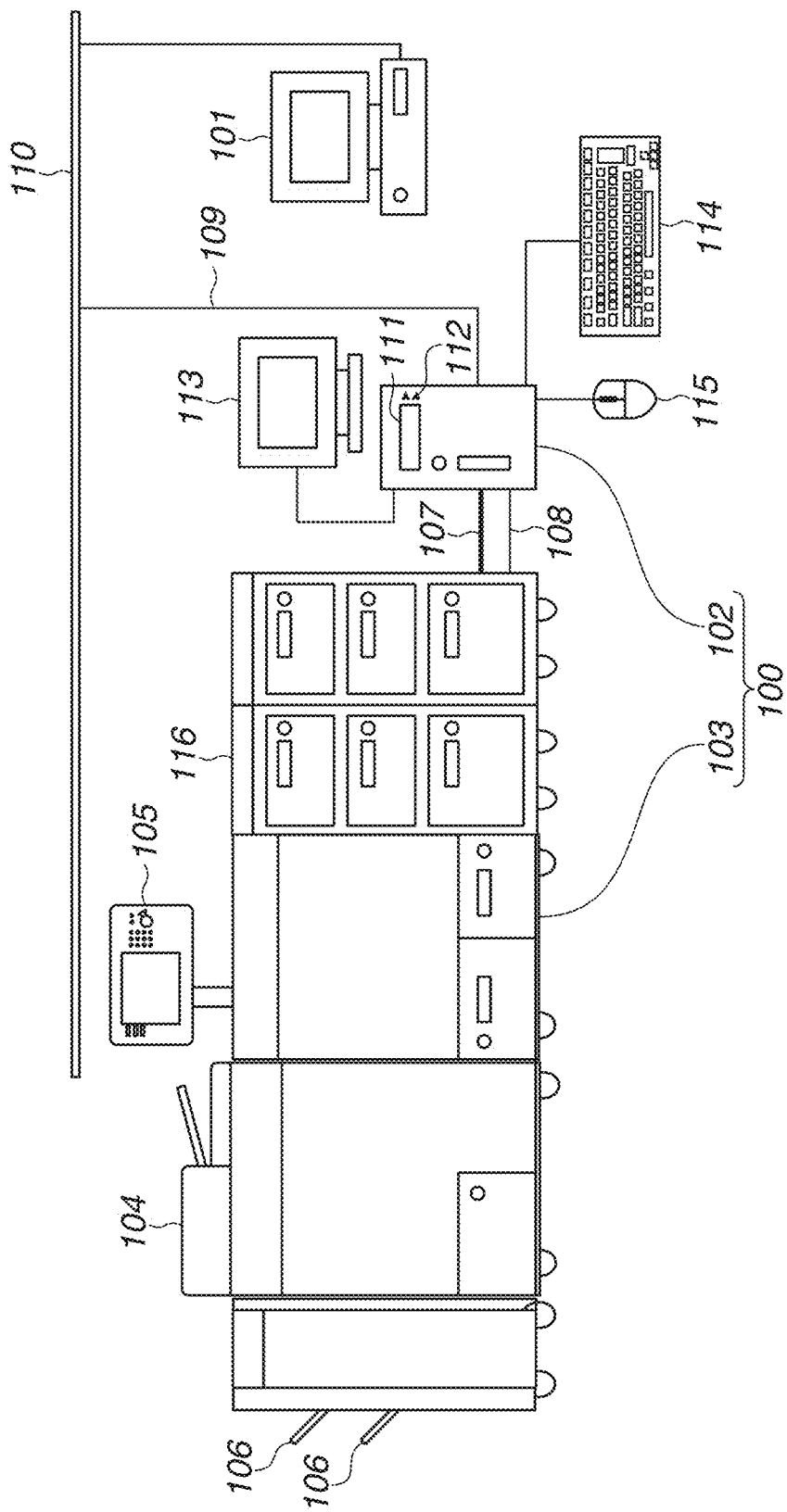
FIG. 1 is a block diagram illustrating an example of a configuration of an image forming system to which one aspect of the embodiments is applied.

FIG. 1 is a block diagram illustrating an entire configuration of an image forming system 100 according to a first exemplary embodiment. The image forming system 100 illustrated in FIG. 1 includes an image forming apparatus 103 and a print control apparatus 102. Then, the image forming system 100 is connected to a client computer 101 in such a way as to be able to communicate with the client computer 101. The client computer 101 and the print control apparatus 102 are interconnected via a local area network (LAN) 110 using a local network cable 109 in such a way as to be able to communicate with each other. Moreover, the print control apparatus 102 and the image forming apparatus 103 are interconnected via an image video cable 107 and a control cable 108. In the present exemplary embodiment, the image forming apparatus 103 is not directly connected to the LAN 110. The image forming apparatus 103 and the client computer 101 communicate with each other via the print control apparatus 102. Furthermore, the image forming apparatus 103 can be connected to the LAN 110. In other words, the image forming apparatus 103 can be directly connected to the client computer 101 in such a way as to be able to communicate with the client computer 101.

The client computer 101 activates an application to issue, for example, a printing instruction to the image forming system 100. The print control apparatus 102 operates as an image processing apparatus which performs image processing in cooperation with the image forming apparatus 103.

The image forming apparatus 103 is a multifunction peripheral equipped with various functions. In the present exemplary embodiment, the image forming apparatus 103 operates as a printing apparatus. The image forming apparatus 103 is able to not only perform image processing according to an instruction from the client computer 101 or the print control apparatus 102 but also print data read from a scanner unit 104 or transmit the data to a shared folder. To scan an image with the scanner unit 104, the image forming system 100 receives various instructions from the user via various keys provided on an operation unit 105. The operation unit 105 displays various pieces of information, such as an execution state of the scan job, via a panel. A sheet discharge tray 106 receives a sheet of paper having an image formed thereon.

A display unit 111 of the print control apparatus 102 displays information about the print control apparatus 102, such as a power supply state or an Internet Protocol (IP) address of the print control apparatus 102. Buttons included in an operation button unit 112 of the print control apparatus 102 can be operated to perform an operation with respect to information displayed on the display unit 111. A display device 113 serves as an external display device for the print control apparatus 102 and is, for example, a liquid crystal monitor. A keyboard 114 and a pointing device 115, such as a mouse, are connected to the print control apparatus 102. The display device 113 can be equipped with a touch panel, thus allowing an input operation to be performed without use of the mouse 115. In the following description, although an explanation indicating that, for example, the mouse 115 is used for an operation on an application, such as pressing of a button, is omitted, such an operation can naturally be performed by using such an input device.

A paper feeding device 116 serves as a paper feed tray in which sheets of paper on which the image forming apparatus 103 forms images are set. In the present exemplary embodiment, although not described in detail, the paper feed tray naturally includes every type of paper feeding device, such as an inserter or a manual feed tray.

The present exemplary embodiment is described using the image forming system 100 in which the print control apparatus 102 and the image forming apparatus 103 are interconnected by the image video cable 107 and the control cable 108. Alternatively, processing performed by the print control apparatus 102 can be included in the internal processing performed by the image forming apparatus 103, so that the image forming system 100 can be implemented by a single printing apparatus.

Figure 2:
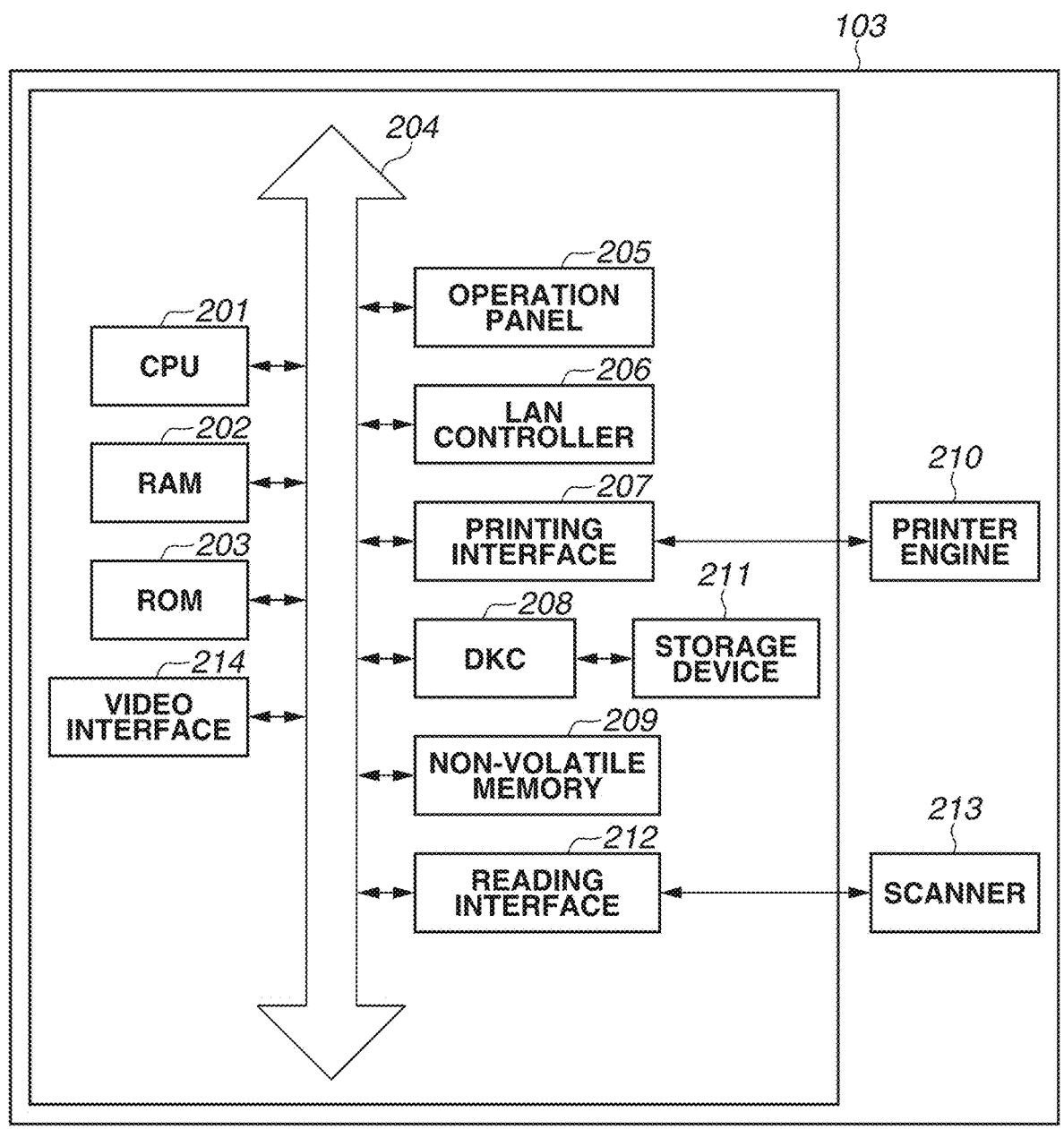
FIG. 2 is a hardware configuration diagram of an image forming apparatus.

FIG. 2 is a block diagram illustrating a hardware configuration of the image forming apparatus 103. Referring to the block diagram of the image forming apparatus 103 illustrated in FIG. 2, a central processing unit (CPU) 201 comprehensively controls various devices connected to a system bus 204 based on a control program stored in a read-only memory (ROM) 203 or a storage device 211. Moreover, the CPU 201 outputs an image signal to a printing unit (printer engine) 210 connected via a printing interface 207, and controls an image signal input from a reading unit (scanner) 213 connected via a reading interface 212. The CPU 201 is capable of performing communication processing with the print control apparatus 102 via a LAN controller 206.

The RAM 202 mainly functions as, for example, a main memory and a work area for the CPU 201. Access to the storage device 211, which is, for example, a hard disk drive (HDD) or an integrated circuit (IC) card, is controlled by a disk controller (DKC) 208. The storage device 211, which is, for example, a hard disk drive, stores, for example, application programs, font data, and form data. The storage device 211 is also a device which stores image data acquired from, for example, a computer of the user via a network or image data obtained by scanning using the scanner 213. In the present exemplary embodiment, an HDD is used as the storage device 211.

An operation panel 205, which is equipped with software keys or hardware keys, receives inputting of various pieces of information. A non-volatile memory 209 stores various pieces of setting information previously set via the operation panel 205 or from a terminal via a network. A video interface 214 receives image data from the print control apparatus 102.

Figure 3:
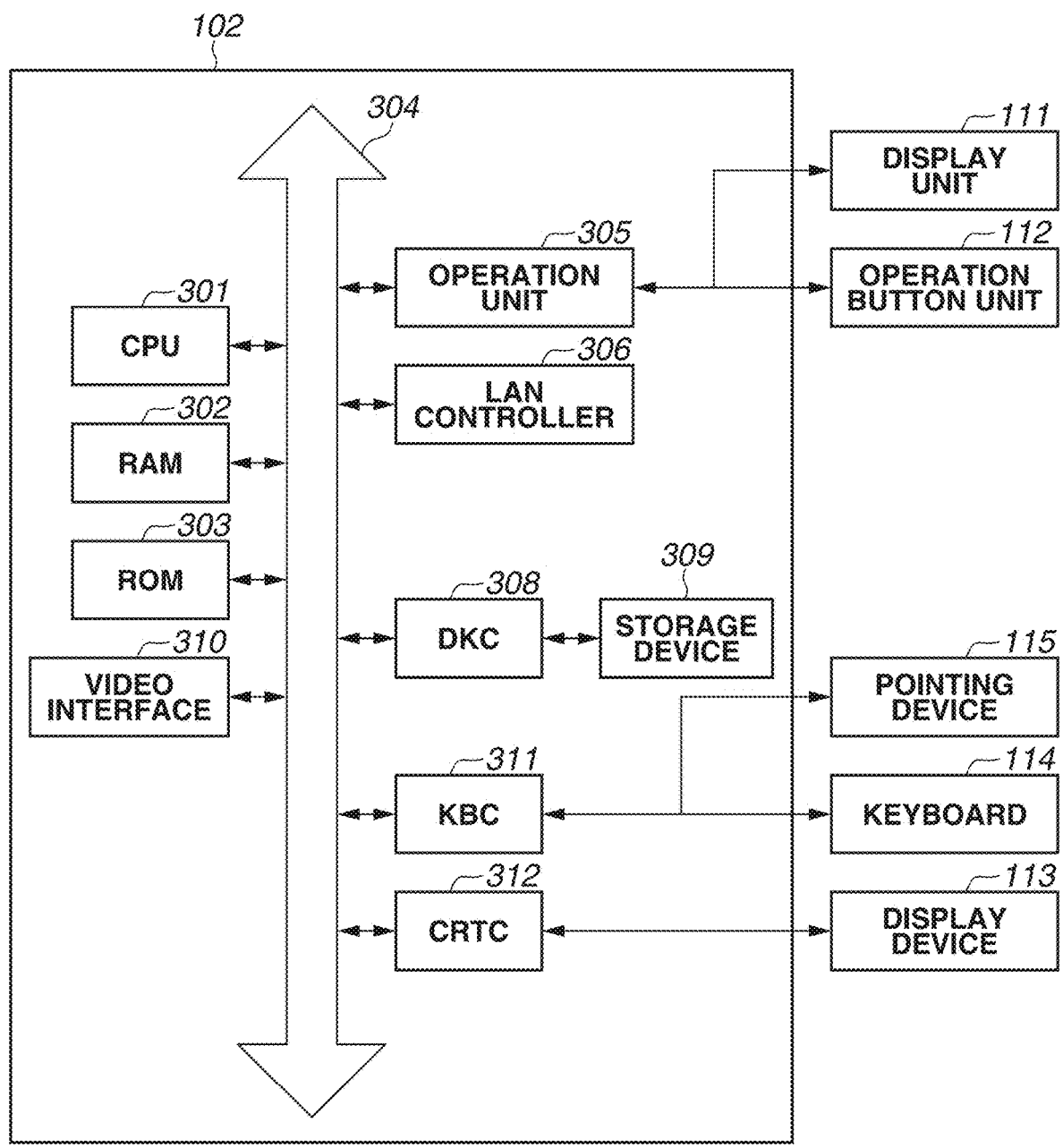
FIG. 3 is a hardware configuration diagram of a print control apparatus.

FIG. 3 is a block diagram illustrating a hardware configuration of the print control apparatus 102. A CPU 301 comprehensively controls various devices connected to a system bus 304 based on a control program stored in a ROM 303 or a storage device 309. Moreover, the CPU 301 is capable of performing communication processing with the image forming apparatus 103 via a LAN controller 306. The CPU 301 is capable of performing communication processing with the client computer 101 on a network or the image forming apparatus 103 via the LAN controller 306.

A RAM 302 mainly functions as, for example, a main memory and a work area for the CPU 301. Access to the storage device 309, which is, for example, an HDD or an IC card, is controlled by a disk controller (DKC) 308. The storage device 309 stores, for example, application programs, font data, and form data. An operation unit 305 receives inputting of various pieces of information from the operation button unit 112 and displays the information on the display unit 111. A video interface 310 transmits image data to the image forming apparatus 103. A keyboard controller (KBC) 311 performs processing concerning inputting of information from the keyboard 114 or the mouse 115. A display control unit (cathode-ray tube controller (CRTC)) 312 contains a video memory therein, and draws image data on the video memory according to an instruction from the CPU 301 and outputs the image data drawn on the video memory as a video signal to the display device 113.

Figure 4:
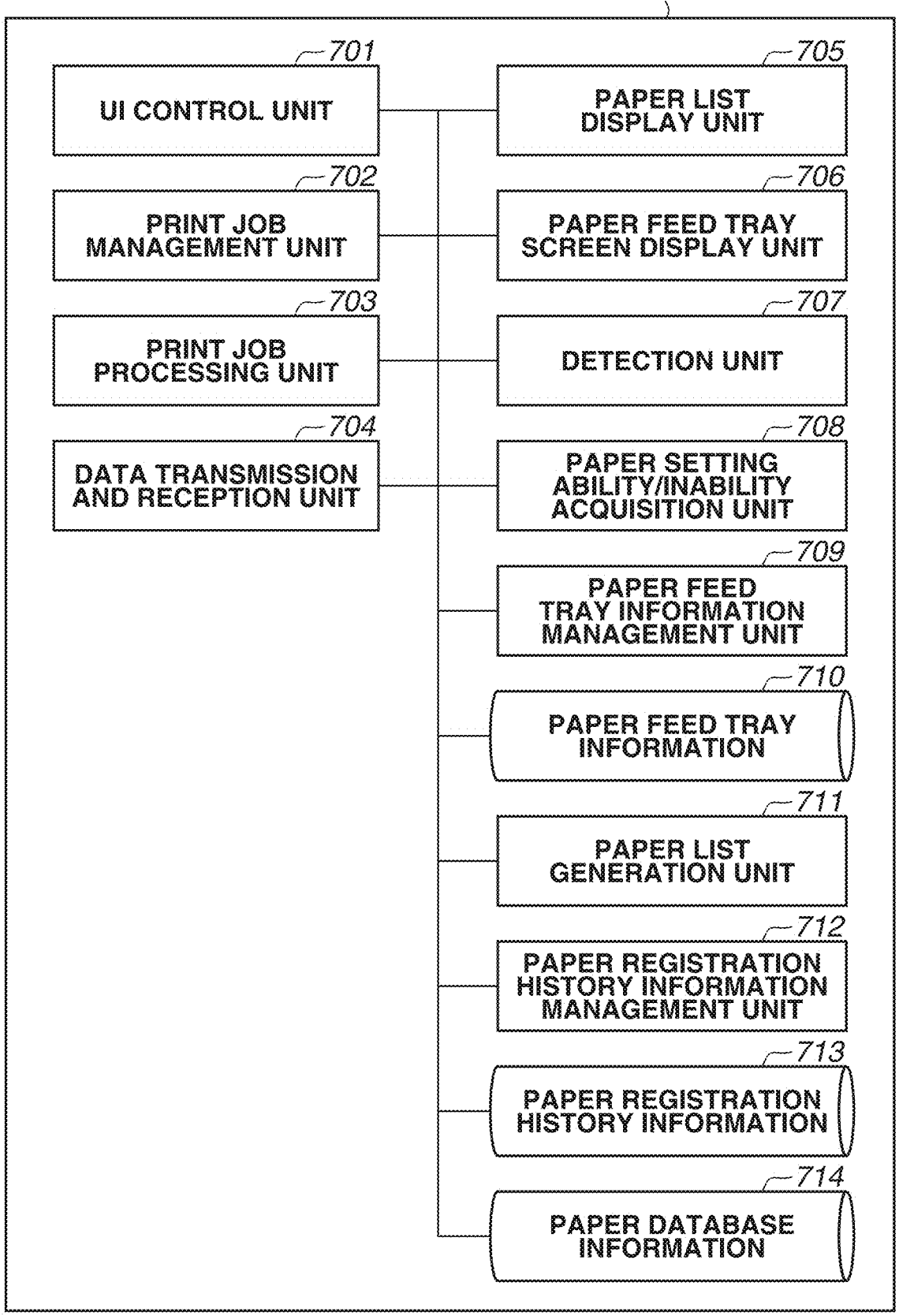
FIG. 4 is a block diagram illustrating a software configuration of the print control apparatus.

FIG. 4 is a block diagram illustrating a software configuration of the print control apparatus 102 according to the present exemplary embodiment. These software modules are stored as a program in the storage device 309, and are loaded onto the RAM 302 and executed by the CPU 301.

A user interface (UI) control unit 701 performs display control over the display unit 111 and the display device 113 via the operation unit 305 and CRTC 312. Moreover, the UI control unit 701 controls inputting of various pieces of setting information which are set via the operation button unit 112, the keyboard 114, and the mouse 115.

A print job management unit 702 manages print job data received from the operator. More specifically, the print job management unit 702 performs processing operations, such as invoking of print job data stored in the storage device 309, reflection of a change made by the operator to settings of a print job, and historical management of print-completed jobs. A print job processing unit 703 performs processing operations required for print processing execution, such as analysis of a print job received from the operator, generation of image data, and image compression and decompression.

A data transmission and reception unit 704 manages transmission and reception of various pieces of data between the print control apparatus 102 and the image forming apparatus 103. Print job data generated by the print job processing unit 703 is transmitted to the image forming apparatus 103 by the data transmission and reception unit 704. Moreover, the data transmission and reception unit 704 also manages data transmission and reception with respect to the client computer 101 connected via an external network.

A paper list display unit 705 displays a paper list on the top screen of a paper management application, which is displayed on the display device 113. The paper management application is an application for managing characteristics, such as types, sizes, and grammages, of paper able to be used by the image forming apparatus 103 and for setting adjustment items with respect to each paper type. The paper list display unit 705 switches displaying on the display device 113 each time the paper list to be displayed is updated. In the present exemplary embodiment, the operator registers in which paper feed tray to set paper indicated by which paper information.

A paper list generation unit 711 generates a paper list which the paper list display unit 705 displays. The paper list generation unit 711 generates a paper list in which pieces of paper information are displayed in descending order of the number of times the operator registered paper information with respect to paper feed trays. Details of processing concerning generation of a paper list are described below.

Paper registration history information 713 is information indicating, with respect to pieces of paper information stored in a paper database, how many times which paper information was registered with respect to which paper feed tray. This information is used for the paper list generation unit 711 to generate a paper list.

A paper registration history information management unit 712 manages the paper registration history information 713. For example, the paper registration history information management unit 712 updates the paper registration history information 713 according to the operator selecting paper information from the paper list and registering the selected paper information with respect to a paper feed tray. Paper database information 714 is a database for storing paper information, such as the type, size, and grammage, of paper able to be used by the image forming apparatus 103. This database is stored in the storage device 309. In addition to paper information previously registered as product specifications of the image forming apparatus 103, paper information generated by the operator performing a predetermined operation using the paper management application is also stored in the paper database information 714. Furthermore, the same information is also stored in the image forming apparatus 103, and, when the database of one of the image forming apparatus 103 and the print control apparatus 102 is updated, the database of the other thereof is also updated via the data transmission and reception unit 704.

Figure 7A:
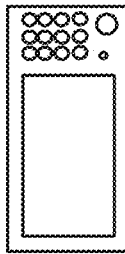

A paper feed tray screen display unit 706 controls displaying of paper feed tray buttons 406 to 413 (FIG. 7A). The paper feed tray screen display unit 706 displays paper information registered with respect to each paper feed tray button according to the operator selecting paper information from the paper list and registering the selected paper information with respect to a paper feed tray.

A detection unit 707 detects a click operation performed on the top screen 401 (FIG. 7A) of the paper management application via an operation unit, such as the mouse 115. When detecting the mouse 115 being clicked, the detection unit 707 also acquires information about the position of clicking of the mouse 115.

A paper setting ability/inability acquisition unit 708 inquires of the image forming apparatus 103 whether paper indicated by paper information selected by the operator is able to be set with respect to each paper feed tray. Moreover, the paper setting ability/inability acquisition unit 708 receives a result of the inquiry from the image forming apparatus 103.

Paper feed tray information 710 stores paper information registered with respect to paper feed trays included in the image forming apparatus 103. The paper feed tray information 710 stores paper information in association with each paper feed tray. For example, when a screen illustrated in FIG. 7A is displayed on the display device 113, the paper feed tray information 710 stores information indicating that paper information "heavy paper A4" is registered with respect to "tray 1".

A paper feed tray information management unit 709 updates the paper feed tray information 710 according to an operation performed by the operator on the keyboard 114 and the mouse 115. Furthermore, the paper feed tray information 710 when being updated is synchronized with paper feed tray information 906 (FIG. 5) included in the image forming apparatus 103 via the data transmission and reception unit 704.

Figure 5:
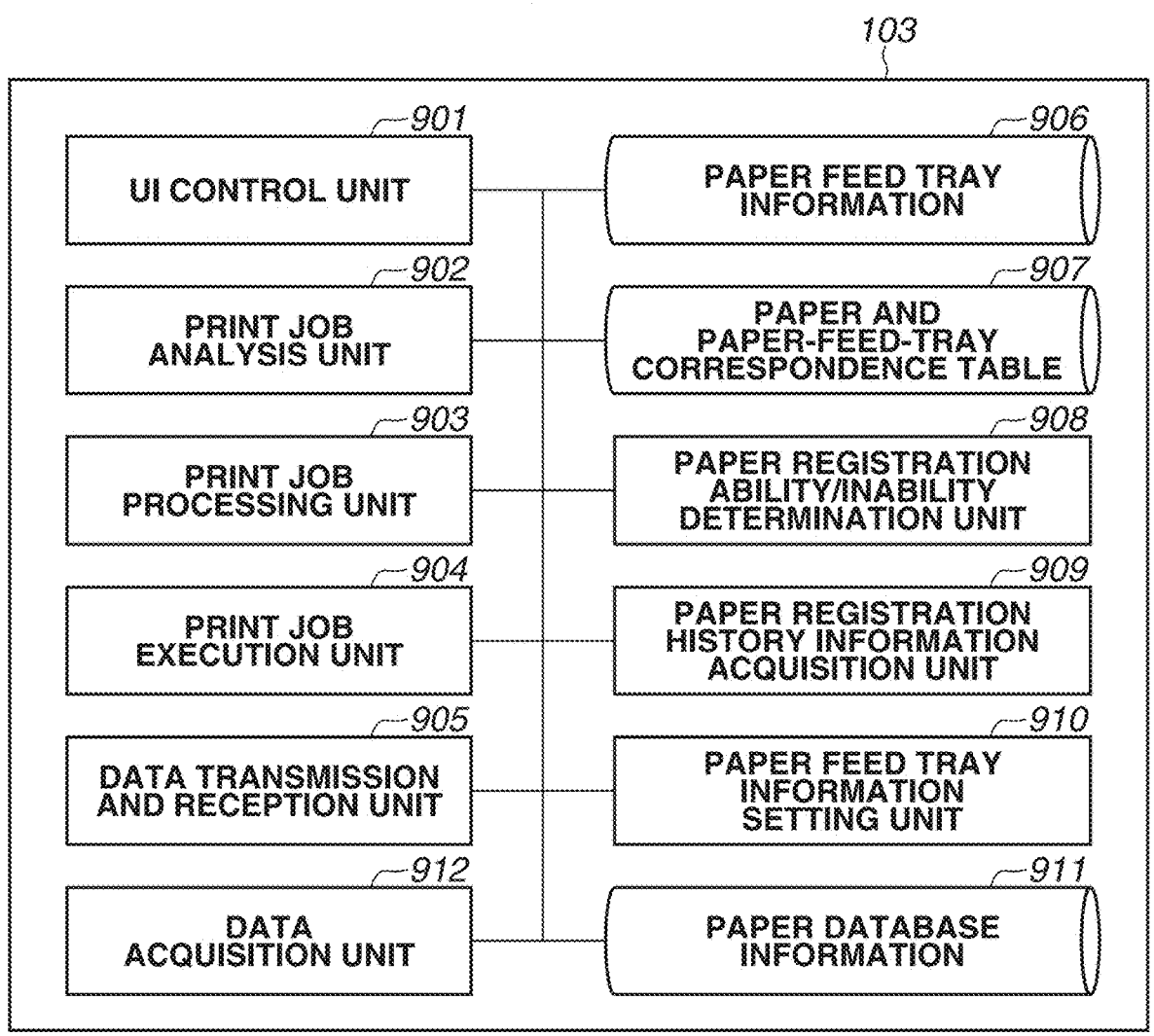
FIG. 5 is a block diagram illustrating a software configuration of the image forming apparatus.

FIG. 5 is a block diagram illustrating a software configuration of the image forming apparatus 103 according to the present exemplary embodiment. These software modules are stored as a program in the storage device 211, and are loaded onto the RAM 202 and executed by the CPU 201.

A UI control unit 901 controls displaying on the operation panel 205 and inputting from the operation panel 205.

A print job analysis unit 902 analyzes data about a print job received from the print control apparatus 102. A print job processing unit 903 performs print processing required for the image forming apparatus 103 on the print job. A print job execution unit 904 controls a series of printing operations, such as paper feeding, paper conveyance, printing, and paper discharge, with respect to the print job. The print job execution unit 904 identifies a paper feed tray in which paper to be used is set, based on information about paper to be used analyzed by the print job analysis unit 902 and paper feed tray information 906, which is described below, and performs paper feeding from the identified paper feed tray. A data transmission and reception unit 905 controls data transmission and reception between the image forming apparatus 103 and the print control apparatus 102.

The paper feed tray information 906 is information in which the relationship between each paper feed tray included in the image forming apparatus 103 and paper information registered with respect to each paper feed tray is stored. The paper feed tray information 906 is updated by being synchronized with the paper feed tray information 710, which is set using the paper management application.

A paper and paper-feed-tray correspondence table 907 is a table indicating the relationship between each paper feed tray and paper which is able to be set in each paper feed tray. FIG. 6 illustrates an example of the paper and paper-feed-tray correspondence table 907. Column 1001 is a column indicating types of paper, such as plain paper, heavy paper, and coated paper. Column 1002 is a column indicating sizes of paper, such as A5, A4, and A3. Columns 1003 to 1010 are columns indicating tray 1 to tray included in the image forming apparatus 103. In the table, mark "○" indicates that the corresponding paper is able to be set in the corresponding paper feed tray, and mark "x" indicates that the corresponding paper is unable to be set in the corresponding paper feed tray. Referring to a row in FIG. 6 enables determining in which paper feed tray the specified paper is able to be set. For example, plain paper of size A4 is able to be set in all of the paper feed trays of tray 1 to tray 8. On the other hand, heavy paper of size A3 is not able to be set in the paper feed trays of tray 1 to tray 3, but is able to be set in the paper feed trays of tray 4 to tray 8. Moreover, referring to FIG. 6 makes it known that neither paper of size A3 nor paper of size B3 is able to be set in the paper feed tray of tray 3.

When receiving an inquiry from the print control apparatus 102, a paper registration ability/inability determination unit 908 refers to the paper and paper-feed-tray correspondence table 907 and determines whether the inquired paper is able to be set in each paper feed tray.

A paper feed tray information setting unit 910 performs processing for storing paper information registered with respect to each paper feed tray and acquiring paper information registered with respect to each paper feed tray.

When the paper feed tray information 906 is updated in the image forming apparatus 103, a paper registration history information acquisition unit 909 acquires the updated information and transmits the acquired updated information to the print control apparatus 102 via the data transmission and reception unit 905.

A paper database information 911 is similar to the above-mentioned paper database information 714 included in the print control apparatus 102, and is, therefore, omitted from description. This database is stored in the storage device 211.

A data acquisition unit 912 acquires model information or hardware option information about the image forming apparatus 103 from the ROM 203 or the storage device 211 of the image forming apparatus 103. In response to a request from the print control apparatus 102, the acquired information is transmitted to the print control apparatus 102 via the data transmission and reception unit 905. In the description with reference to FIG. 4 and FIG. 5, the paper feed tray information 710 and the paper feed tray information 906 and the paper database information 714 and the paper database information 911 are respectively stored in the print control apparatus 102 and the image forming apparatus 103. However, each of the paper feed tray information and the paper database information can be configured to be stored in any one of the print control apparatus 102 and the image forming apparatus 103.

The paper management application used in the present exemplary embodiment is described with reference to FIGS. 7A and 7B.

FIGS. 7A and 7B each illustrate a top screen displayed on the display device 113 when the paper management application is activated. The paper management application starts to operate by being activated by the operator on the print control apparatus 102. FIG. 7A illustrates a screen in which paper information about various types of paper set in the respective paper feed trays mounted in the image forming apparatus 103 is displayed. FIG. 7B illustrates a screen in which buttons usable to set various adjustment items of the image forming apparatus 103 are displayed. The top screen of the paper management application is drawn as image data on the video memory according to an instruction from the CPU 301, and the image data drawn on the video memory is output as a video signal to the display device 113 and is displayed thereon.

The top screen 401 of the paper management application includes a display region 402 in which the display content is able to be changed using a device tab 403 and an adjustment tab 404. When the operator presses the device tab 403, the top screen 401 illustrated in FIG. 7A in which paper information about various types of paper set in the respective paper feed trays of the image forming apparatus 103 is displayed in the display region 402 is displayed. When the operator presses the adjustment tab 404, the top screen 401 illustrated in FIG. 7B in which buttons usable to set various adjustment items are displayed in the display region 402 is displayed.

A connection status 405 representing hardware options of the image forming apparatus 103 connected to the print control apparatus 102 is also displayed. When the paper management application is activated, the print control apparatus 102 acquires hardware option information about the image forming apparatus 103 and displays an appropriate image according to the hardware option information. FIG. 7A in the present exemplary embodiment illustrates a status in which a plurality of print-on-demand (POD) decks each including a plurality of paper feed trays is mounted and a finisher is also mounted.

The paper feed tray buttons 406 to 413 are also displayed. On the paper feed tray buttons 406 to 413, paper information about various types of paper set in the respective paper feed trays is respectively displayed. A paper list display region 414 in which a paper list that is based on paper information stored in the paper database information 714 is displayed is also displayed. In the paper list display region 414, the columns indicate attribute information, such as size and grammage, about various types of paper, and the rows indicate types of paper. To cause other than currently-displayed attribute information about types of paper to be displayed, the operator can move a slider bar 416. To cause other than currently-displayed types of paper to be displayed, the operator can move a slider bar 415. When the device tab 403 is selected, the operator can simultaneously confirm both paper information about various types of paper set in the respective paper feed trays and a list of paper information stored in the paper database information 714.

FIG. 7B illustrates a screen for setting adjustment items for each piece of paper information about the paper information displayed in the paper list display region 414. Buttons 417 usable to set various adjustment items are displayed. Adjustment items which are able to be adjusted in the image forming apparatus 103 are also displayed. A slider bar 418 can be moved to enable confirming settings of adjustment items that are not currently displayed.

The operator can register paper information with respect to a paper feed tray using the top screen of the paper management application. The operator selects the device tab 403. The operator presses the cursor of the mouse in conformity with paper information about paper to be selected. The paper information which is able to be selected includes paper information that is currently displayed on the paper list or paper information that is currently registered with respect to the respective paper feed tray buttons 406 to 413. While holding down the button of the mouse with the cursor placed in conformity with paper information intended to be selected, the operator moves the cursor to a position where a paper feed tray button in which to set paper indicated by the corresponding paper information is displayed. After the cursor is moved to the position of the paper feed tray button with respect to which the paper information is intended to be registered, the operator releases the button of the mouse. In doing so, the operator can register the selected paper information with respect to a paper feed tray pointed to by the cursor when the operator releases the button of the mouse. After registering the paper information with respect to the paper feed tray, the operator sets paper indicated by the paper information in the paper feed tray.

Figure 8:
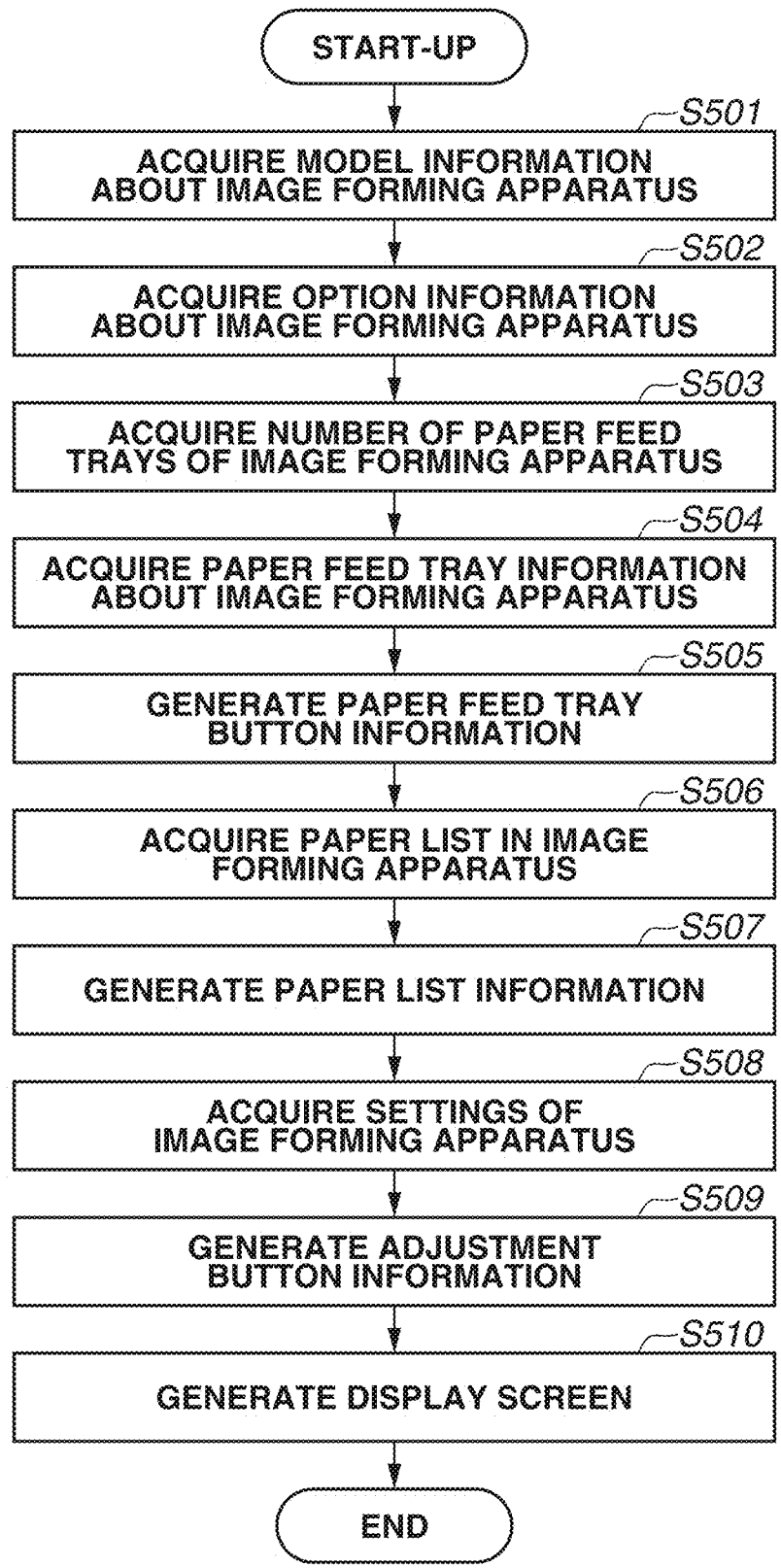
FIG. 8 is a flowchart illustrating processing performed at the time of start-up of the paper management application in the print control apparatus.

FIG. 8 illustrates processing which the print control apparatus 102 performs when starting up the paper management application. A program for performing the processing illustrated in the flowchart of FIG. 8 is stored in the storage device 309 illustrated in FIG. 3, and is loaded onto the RAM 302 and executed by the CPU 301.

When the paper management application is started up, in step S501, the data transmission and reception unit 704 communicates with the image forming apparatus 103 and acquires model information about the image forming apparatus 103, which serves as a target for paper management by the paper management application. The model information about the image forming apparatus 103 is used to, for example, generate an image indicating the connection status 405 of hardware options.

In step S502, the data transmission and reception unit 704 acquires hardware option information about hardware options mounted on the image forming apparatus 103. The hardware option information received by the data transmission and reception unit 704 is used to, for example, generate an image indicating the connection status 405 of hardware options.

In step S503, the data transmission and reception unit 704 acquires the number of paper feed trays mounted in the image forming apparatus 103 connected to the print control apparatus 102.

In step S504, the data transmission and reception unit 704 communicates with the image forming apparatus 103 and acquires paper information registered with respect to each paper feed tray.

In step S505, the paper feed tray screen display unit 706 generates information about the paper feed tray buttons 406 to 413 to be displayed in the top screen 401 of the paper management application.

In step S506, the data transmission and reception unit 704 communicates with the image forming apparatus 103 and acquires information about a paper list from the image forming apparatus 103. The paper list is stored in the storage device 211 of the image forming apparatus 103, and the paper list stored in the image forming apparatus 103 is synchronized with a paper list stored in the print control apparatus 102.

In step S507, the paper list generation unit 711 generates information about a paper list to be displayed in the paper list display region 414 of the top screen 401 of the paper management application, based on the paper list acquired in step S506. Processing for generating a paper list to be displayed on the display device 113 of the print control apparatus 102 can be performed in a method other than the above-described method. For example, in step S505, the data transmission and reception unit 704 can synchronize a paper database stored in the image forming apparatus 103 and a paper database stored in the print control apparatus 102 with each other. Then, in step S506, the paper list generation unit 711 can generate a paper list based on the synchronized paper database.

In step S508, the data transmission and reception unit 704 communicates with the image forming apparatus 103 and acquires settings of the respective adjustment items to be used by the adjustment buttons 417.

In step S509, the UI control unit 701 generates character strings to be displayed on the respective buttons 417, based on the acquired settings. In a case where there is only one setting, the value of the setting is displayed, and, in a case where there are two or more settings, "adjustment" or "no adjustment" is displayed.

In step S510, the UI control unit 701 generates the top screen 401 of the paper management application using the model information, hardware option information, paper feed tray button information, paper list information, and adjustment button information about the image forming apparatus 103, and displays the top screen 401 on the display device 113. With this, the screens illustrated in FIGS. 7A and 7B are generated, and the screen illustrated in FIG. 7A is displayed on the display device 113.

Figure 9:
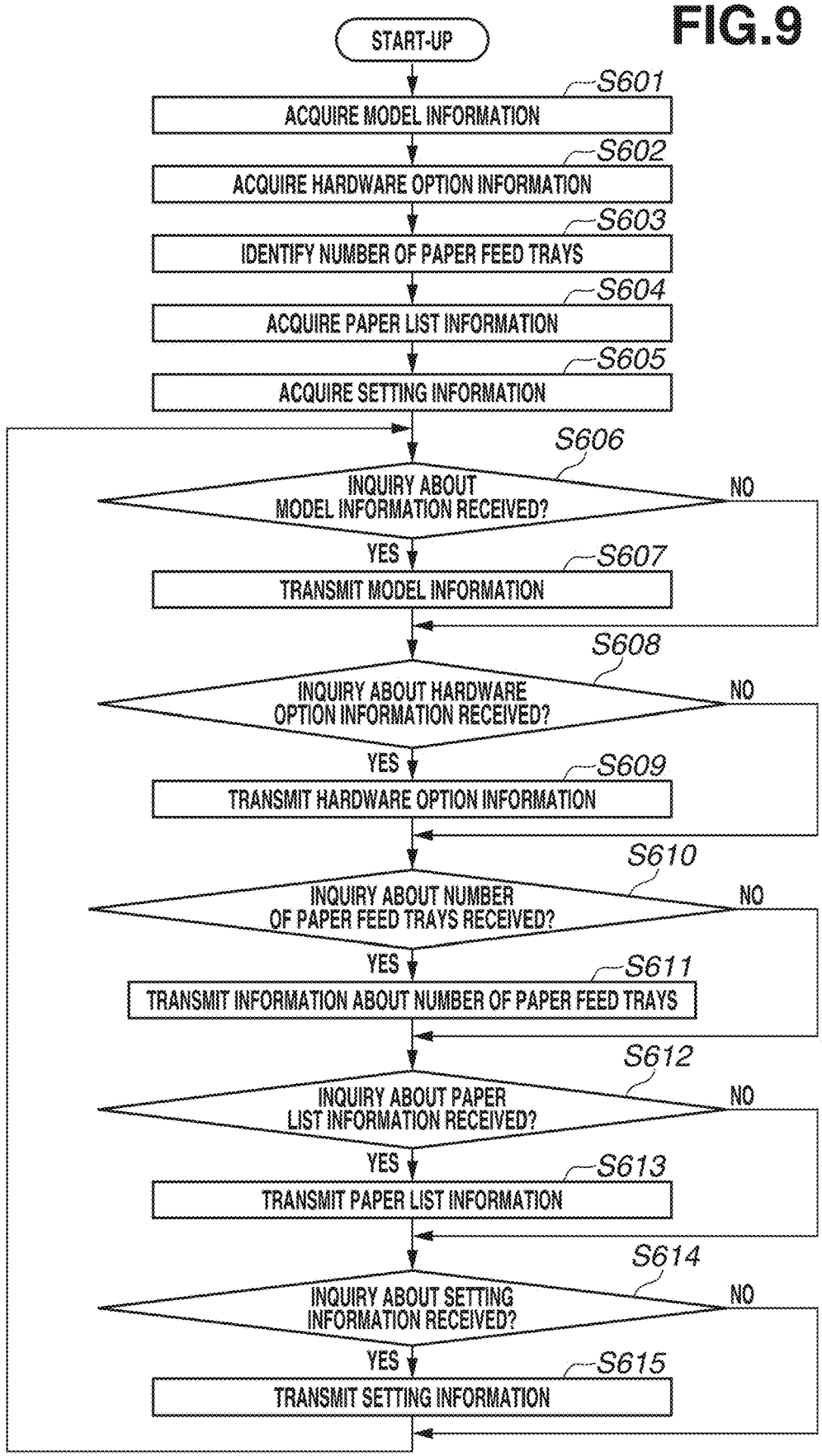
FIG. 9 is a flowchart illustrating processing performed at the time of start-up of the image forming apparatus.

An operation of the image forming apparatus 103 when the print control apparatus 102 is started up is described with reference to the flowchart of FIG. 9. A program for performing the processing illustrated in the flowchart of FIG. 9 is stored in the storage device 211, and is loaded onto the RAM 202 and executed by the CPU 201. After starting up, the image forming apparatus 103 performs processing illustrated in the flowchart of FIG. 9.

In step S601, the data acquisition unit 912 acquires model information about the image forming apparatus 103 itself from the storage device 211. In step S602, the data acquisition unit 912 acquires hardware option information about hardware options connected to the image forming apparatus 103 itself from the storage device 211. In step S603, the data acquisition unit 912 identifies the number of paper feed trays based on information about the paper feed trays included in the image forming apparatus 103 itself and the hardware option information acquired in step S602. In step S604, the data acquisition unit 912 acquires paper list information from the storage device 211. In step S605, the data acquisition unit 912 acquires settings of the respective adjustment items from the storage device 211. The data acquisition unit 912 acquires settings with respect to all of the adjustment items that are able to be performed in the image forming apparatus 103.

In step S606, the data transmission and reception unit 905 determines whether an inquiry about model information has been received from the print control apparatus 102. If it is determined that an inquiry about model information has been received from the print control apparatus 102 (YES in step S606), then in step S607, the data transmission and reception unit 905 transmits the model information acquired in step S601 by the data acquisition unit 912 to the print control apparatus 102.

If it is determined that an inquiry about model information has not been received (NO in step S606) or after the data transmission and reception unit 905 transmits the model information to the print control apparatus 102 (in step S607), then in step S608, the data transmission and reception unit 905 determines whether an inquiry about hardware option information has been received from the print control apparatus 102. If it is determined that an inquiry about hardware option information has been received (YES in step S608), then in step S609, the data transmission and reception unit 905 transmits the hardware option information acquired by the data acquisition unit 912 to the print control apparatus 102.

If it is determined that an inquiry about hardware option information has not been received (NO in step S608) or after the data transmission and reception unit 905 transmits the hardware option information (in step S609), then in step S610, the data transmission and reception unit 905 determines whether an inquiry about the number of paper feed trays has been received from the print control apparatus 102. If it is determined that an inquiry about the number of paper feed trays has been received (YES in step S610), then in step S611, the data transmission and reception unit 905 transmits the number of paper feed trays identified in step S603 to the print control apparatus 102.

If it is determined that an inquiry about the paper feed tray information has not been received from the print control apparatus 102 (NO in step S610) or after the data transmission and reception unit 905 transmits information about the number of paper feed trays (in step S611), then in step S612, the data transmission and reception unit 905 determines whether an inquiry about paper list information has been received from the print control apparatus 102. If it is determined that an inquiry about paper list information has been received (YES in step S612), then in step S613, the data transmission and reception unit 905 transmits the paper list information acquired by the data acquisition unit 912 to the print control apparatus 102.

If it is determined that an inquiry about paper list information has not been received (NO in step S612) or after the data transmission and reception unit 905 transmits the paper list information (in step S613), then in step S614, the data transmission and reception unit 905 determines whether an inquiry about setting information has been received from the print control apparatus 102. If it is determined that an inquiry about setting information has been received (YES in step S614), then in step S615, the data transmission and reception unit 905 transmits the setting information acquired by the data acquisition unit 912 to the print control apparatus 102, and the processing then returns to step S606. If it is determined that an inquiry about setting information has not been received (NO in step S614), the processing also returns to step S606.

In the present exemplary embodiment, the display order of paper information displayed on the paper list, which the paper list generation unit 711 generates, is changed according to the number of times of registration of paper information stored in the paper registration history information 713 of the print control apparatus 102. The contents which are stored as the paper registration history information 713 are described with reference to FIG. 10. The paper registration history information 713 is stored in the storage device 309, and is loaded onto the RAM 302 and used by the CPU 301.

Column 801 is a column indicating paper information registered with the paper database information 714. Column 802 is a column indicating a paper feed tray included in the image forming apparatus 103. In the present exemplary embodiment, data is stored for each paper feed tray. Each numerical value stored for each piece of paper information in the paper database information 714 represents the number of times the corresponding piece of paper information was registered with respect to each paper feed tray. For example, it is shown that paper information "plain paper A4" was registered with respect to tray 1 twenty-six times and with respect to tray 2 three times. Column 803 is a column indicating, for each piece of paper information, the number of times the corresponding piece of paper information was registered with respect to all of the paper feed trays. Each numerical value stored in the column 803 is equal to the sum of the numbers of times the corresponding piece of paper information was registered with respect to the respective paper feed trays. For example, paper information "recycled paper A3" was registered ninety-eight times in total with respect to all of the paper feed trays.

FIG. 11A illustrates a list generated by the paper list generation unit 711 using the above-mentioned paper registration history information 713. The paper list generated by the paper list generation unit 711 is displayed in the paper list display region 414 of the top screen of the paper management application. In FIG. 11A, various pieces of paper information are arranged in descending order of the total number of times with regard to the column 803 of the paper registration history information 713 illustrated in FIG. 10. Displaying various pieces of paper information in order from paper information with the greater number of times of registration as illustrated in FIG. 11A enables causing paper with the greater number of times of registration with respect to paper feed trays to appear higher up in display rankings on the paper list, thus providing such a display as to allow the operator to easily select the intended paper.

Next, processing performed by the print control apparatus 102 in the present exemplary embodiment after generating the top screen of the paper management application is described with reference to FIG. 12 to FIG. 14. A program for performing the processing illustrated in the flowcharts of FIG. 12 to FIG. 14 is stored in, for example, the ROM 303, and the program is loaded onto the RAM 302 and executed by the CPU 301 to implement the processing.

Figure 12:
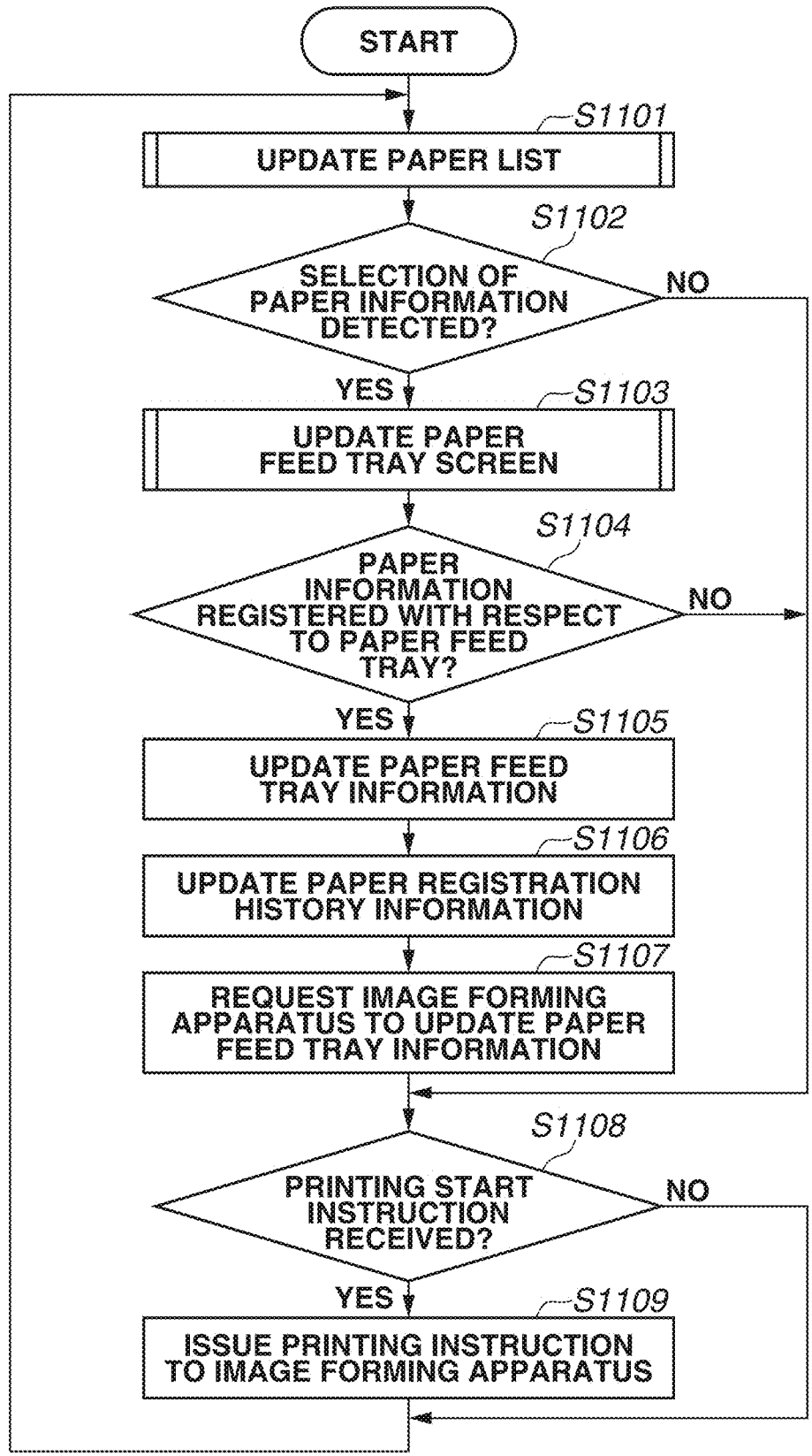
FIG. 12 is a flowchart illustrating processing performed after start-up of the paper management application in the print control apparatus.
Figure 13:
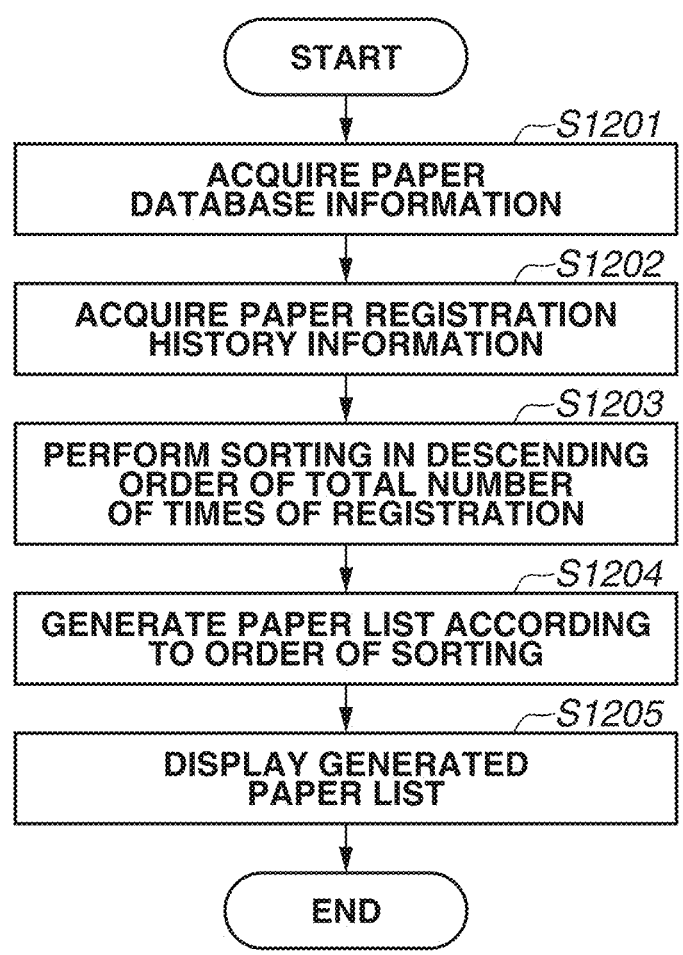
FIG. 13 is a flowchart illustrating processing for updating a paper list in the print control apparatus.

FIG. 12 illustrates processing which the print control apparatus 102 performs after starting up the paper management application. The processing illustrated in FIG. 12 is repeatedly continued until the paper management application ends.

In step S1101, the paper list display unit 705 updates the content of a paper list to be displayed in the paper list display region 414. Details of the processing which the paper list display unit 705 performs are described below with reference to FIG. 13.

In step S1102, the detection unit 707 detects whether paper information has been selected via the mouse 115. The detection unit 707 detects that the operator has pressed the button of the mouse 115 while pointing the cursor of the mouse 115 to paper information included in the paper list or paper information displayed on a paper feed tray button. The detection unit 707 detects that the button of the mouse 115 has been pressed with the cursor of the mouse 115 placed on paper information, thus recognizing that the paper information has been selected. If the detection unit 707 has not detected the selection of paper information (NO in step S1102), the print control apparatus 102 advances the processing to step S1108.

In step S1103, the paper feed tray screen display unit 706 updates the display content of the paper feed tray screen (the paper feed tray buttons 406 to 413) according to the paper information being selected. Details of processing performed in step S1103 are described below with reference to FIG. 14.

In step S1104, the detection unit 707 determines whether the selected paper information has been registered with respect to a paper feed tray. The detection unit 707 detects that the operator has dragged the paper information selected in step S1102 to a location in which any one of the paper feed tray buttons 406 to 413 is displayed and then has dropped the dragged paper information onto the location by releasing the button of the mouse 115. In the present exemplary embodiment, an operation of selecting paper information by clicking the button of the mouse 115, dragging the paper information to a paper feed tray, and dropping the paper information by releasing the button of the mouse 115 is referred to as "dragging and dropping paper information". At this time, in a case where the button of the mouse 115 being released with the cursor of the mouse 115 placed on the location of any one of the paper feed tray buttons 406 to 413 is detected, paper information selected with respect to the paper feed tray pointed to by the cursor is registered. If, after paper information is selected, the cursor of the mouse is not placed on a paper feed tray button when the button of the mouse is released, processing in step S1108 and subsequent steps is performed without the selected paper information being registered in association with any paper feed tray. Besides, after paper information is pressed and selected from the paper list, a paper feed tray can be selected by pressing a paper feed tray button of the paper feed tray in which to set paper indicated by the paper information. If an operation for registering paper information with respect to a paper feed tray is not performed (NO in step S1104), the processing proceeds to step S1108 described below.

If, in step S1104, it is determined that the selected paper information has been registered with respect to a paper feed tray (YES in step S1104), then in step S1105, the paper feed tray information management unit 709 updates the paper feed tray information 710. In step S1105, in addition to the paper feed tray information management unit 709 updating the paper feed tray information 710, the paper feed tray screen display unit 706 updates and displays the display content of the paper feed tray screen displayed on the display device 113.

In step S1106, the paper registration history information management unit 712 updates information about the number of times of registration of paper information included in the paper registration history information 713. Here, with respect to the paper information selected in step S1102, the number of times of registration with respect to the paper feed tray selected in step S1104 and the number of times of registration with respect to all of the paper feed trays are incremented by one.

In step S1107, the data transmission and reception unit 704 transmits the paper feed tray information 710 updated in step S1105 to the image forming apparatus 103, and also requests the image forming apparatus 103 to update the paper feed tray information 906 included in the image forming apparatus 103 and information acquired by the paper registration history information acquisition unit 909.

In step S1108, the print job processing unit 703 determines whether a printing start instruction has been received from the operator. The printing start instruction refers to, for example, a print job being input from the client computer 101. Alternatively, the printing start instruction can refer to the paper management application receiving a printing start request instruction from an application included in the print control apparatus 102 and different from the paper management application. If it is determined that the printing start instruction has not been received (NO in step S1108), the processing returns to step S1101.

If, in step S1108, it is determined that the printing start instruction has been received (YES in step S1108), then in step S1109, the print job processing unit 703 issues a printing instruction to the image forming apparatus 103. After the print job processing unit 703 issues the printing instruction to the image forming apparatus 103, the print control apparatus 102 returns the processing to step S1101, thus repeating the processing in this flowchart.

Next, the processing performed by the paper list generation unit 711 in step S1101 illustrated in FIG. 12 is described with reference to the flowchart of FIG. 13. This flowchart is started in response to updating of the paper list being requested in the above-mentioned step S1101.

In step S1201, the paper list generation unit 711 acquires the paper database information 714. This information is used to generate a paper list as described below.

In step S1202, the paper list generation unit 711 acquires the paper registration history information 713.

In step S1203, the paper list generation unit 711 refers to the column 803 in the paper registration history information 713 and sorts various pieces of paper information in descending order of the total number of times of registration with respect to all of the paper feed trays. The method for performing sorting of various pieces of paper information is assumed to use a generally-known sort algorithm, such as bubble sort, heap sort, or quick sort. Naturally, sorting can be performed by using methods other than the above-mentioned methods. While, in the description of the present exemplary embodiment, sorting is performed in descending order of the number of times of registration with respect to the paper feed trays, sorting can be performed, for example, in ascending order of the number of times of registration.

After sorting of pieces of paper information is completed, in step S1204, the paper list generation unit 711 generates a paper list according to the order of sorting calculated in step S1203.

In step S1205, the paper list display unit 705 displays the paper list generated in step S1204 at the paper list display region 414.

Performing the processing illustrated in FIG. 13 enables arranging pieces of paper information stored in the paper database in descending order of the number of times of registration with respect to the paper feed trays. In this way, the operator can reduce the trouble of searching for paper information with the greater number of times of registration with respect to paper feed trays from the paper list.

FIG. 14 illustrates processing which is started in response to updating of the paper feed tray screen being requested in step S1103 illustrated in FIG. 12.

The detection unit 707 identifies the paper information selected in step S1102. After that, in step S1401, the paper setting ability/inability acquisition unit 708 inquires of the image forming apparatus 103 whether the selected paper information is able to be registered with respect to the paper feed tray "tray 1".

In step S1402, the paper setting ability/inability acquisition unit 708 receives, from the image forming apparatus 103, setting ability/inability information indicating whether the selected paper information is able to be registered with respect to the tray 1. The setting ability/inability information is determined based on the paper and paper-feed-tray correspondence table 907 stored in the storage device 211 of the image forming apparatus 103. Here, the paper information is assumed not to be able to be registered even with respect to the paper feed tray currently used for printing.

In step S1403, the paper feed tray screen display unit 706 determines whether the paper information selected based on the setting ability/inability information received in step S1402 is able to be registered with respect to the tray 1. If it is determined that the selected paper information is not able to be registered with respect to the tray 1 (NO in step S1403), the paper feed tray screen display unit 706 performs processing described in step S1404, and, if it is determined that the selected paper information is able to be registered with respect to the tray 1 (YES in step S1403), the paper feed tray screen display unit 706 performs processing described in step S1405.

If, in step S1403, it is determined that the selected paper information is not able to be registered (NO in step S1403), then in step S1404, the paper feed tray screen display unit 706 grays out the paper feed tray button 406 of the tray 1 so as to visually indicate that the selected paper information is not able to be registered with respect to the tray 1. FIG. 15A illustrates an example of a screen which is displayed on the display device 113 at the time of selection of paper information in the present exemplary embodiment. In FIG. 15A, a case where the operator has selected paper information 1501 in step S1102 is illustrated. Although, in FIG. 15A, such a display as to make the selected paper information conspicuous is not provided, the display screen can be changed in such a way as to make the selected paper information conspicuous, such as to reverse the color of the selected paper information or to surround the selected paper information with a thick frame border. Since "thick paper A4" indicated by the paper information 1501 is not able to be set in the tray 1 and the tray 2, "tray 1" 1503 and "tray 2" 1502 are grayed out and are controlled to be unavailable for registering the paper information. On the other hand, since "thick paper A4" is able to be set in the tray 3 to the tray 8, "tray 3" to "tray 8" are not grayed out and are available for registering the paper information.

In step S1405, the paper feed tray screen display unit 706 determines whether the processing has been completed with respect to all of the paper feed trays indicated by the paper feed tray buttons 406 to 413. If it is determined that the processing has been completed with respect to all of the paper feed trays (YES in step S1405), the processing ends, and, if not so (NO in step S1405), the processing returns to step S1401, so that the paper feed tray screen display unit 706 repeats the processing in steps S1401 to S1405 with respect to unprocessed ones of the paper feed tray buttons 406 to 413.

Figure 16:
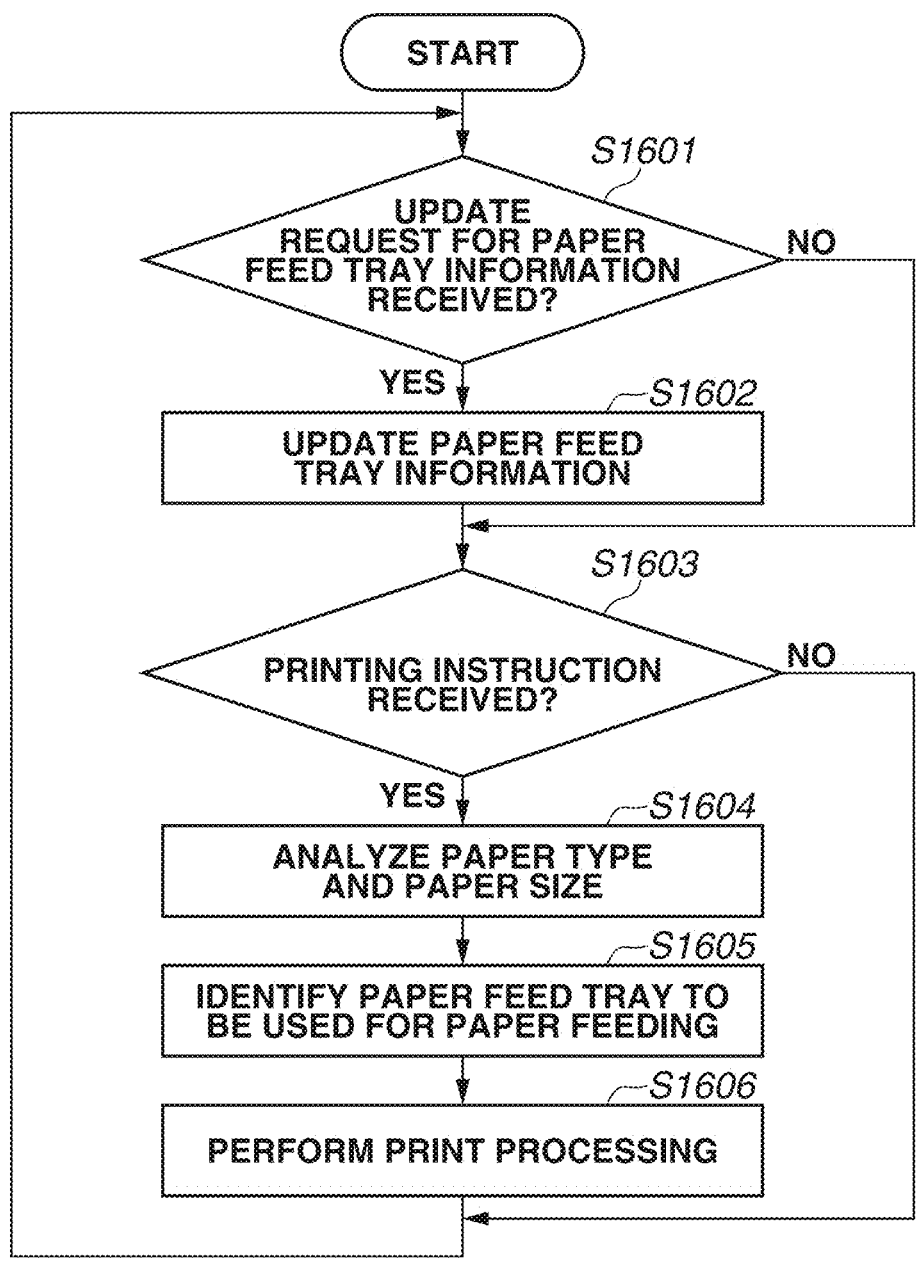
FIG. 16 is a flowchart illustrating processing performed in the image forming apparatus after start-up of the paper management application.

Processing which the image forming apparatus 103 performs in response to receiving a request for updating the paper feed tray information transmitted from the print control apparatus 102 in step S1107 is described with reference to FIG. 16. A program for performing the processing illustrated in the flowchart of FIG. 16 is stored in the storage device 211 illustrated in FIG. 2, and is loaded onto the RAM 202 and executed by the CPU 201.

In step S1601, the data transmission and reception unit 905 determines whether an update request for the paper feed tray information 906 has been received from the print control apparatus 102. If it is determined that the data transmission and reception unit 905 has received the update request for the paper feed tray information 906 from the print control apparatus 102 (YES in step S1601), the processing proceeds to step S1602, and, if it is determined that the data transmission and reception unit 905 has not received the update request (NO in step S1601), the processing proceeds to step S1603.

If, in step S1601, the data transmission and reception unit 905 has received the update request for the paper feed tray information 906 (YES in step S1601), then in step S1602, the paper feed tray information setting unit 910 updates the paper feed tray information 906 based on the paper feed tray information 710 received from the print control apparatus 102.

In step S1603, the data transmission and reception unit 905 determines whether a printing instruction has been received from the print control apparatus 102. If it is determined that the data transmission and reception unit 905 has received the printing instruction (YES in step S1603), the processing proceeds to step S1604, and, if it is determined that the data transmission and reception unit 905 has not received the printing instruction (NO in step S1603), the processing returns to step S1601.

If, in step S1603, the data transmission and reception unit 905 has received the printing instruction (YES in step S1603), then in step S1604, the print job analysis unit 902 analyzes the paper type and paper size of paper used for printing based on the printing instruction (print job) received from the print control apparatus 102.

In step S1605, the paper feed tray information setting unit 910 identifies a paper feed tray with respect to which the same paper information as that indicating the analyzed paper type and paper size is registered.

The print job execution unit 904 feeds paper from the paper feed tray determined in step S1605. In step S1606, the print job execution unit 904 prints data contained in the printing instruction on the fed paper.

After performing all of the processing operations up to step S1606, the image forming apparatus 103 continues repeating the processing operations starting with step S1601.

In the first exemplary embodiment, count processing for counting the number of times each piece of paper information stored in a paper database was registered with respect to paper feed trays is performed, and various pieces of paper information are arranged side by side and displayed in a list based on the number of times of registration with respect to the paper feed trays. As a result, paper information with the greater number of times of registration, which is frequently registered with respect to paper feed trays, is enabled to appear higher up in display rankings on the paper list. In this way, such a display as to enable the operator to easily find paper information with the greater number of times of registration with respect to paper feed trays from a list of paper information can be provided.

Furthermore, in the first exemplary embodiment, when the operator has selected paper information used for registration from the paper information list or the paper feed tray buttons of the paper feed trays with the registered paper information, a paper feed tray with respect to which the selected paper information is not able to be registered is grayed out. In this way, the operator can be immediately informed of a paper feed tray with respect to which the paper information selected by the operator is not able to be registered, so that the operator can be prevented from setting the paper information intended to be registered in the paper feed tray unavailable for registration.

In the description of the first exemplary embodiment, when paper information has been selected, the print control apparatus 102 grays out the paper feed tray button (any of 406 to 413) of a paper feed tray with respect to which the selected paper information is not able to be registered. However, in the first exemplary embodiment, the operator cannot be informed of a paper feed tray with respect to which the selected paper information is recommended to be registered. Therefore, in a second exemplary embodiment, when the operator has selected paper information, a screen displayed on the display device 113 is changed in such a way as to enable the operator to recognize a paper feed tray with respect to which the selected paper information is recommended to be registered.

Besides the paper type and paper size, settings of adjustment items, such as "image position adjustment", "curl correction", and "adjustment of saddle folding position", are stored in the paper database information 714. These settings of adjustment items vary with combinations of the type of paper and a paper feed tray in which to set the paper. Accordingly, settings of adjustment items of each piece of paper information are considered to be set in conformity with a paper feed tray which was used when printing was performed the last time with the use of the corresponding paper. In the second exemplary embodiment, when paper information has been selected, a paper feed tray with respect to which the paper information is recommended to be registered is determined based on information indicating in which paper feed tray the corresponding paper was set the last time, and the user is notified of the determined paper feed tray.

Figure 15B:
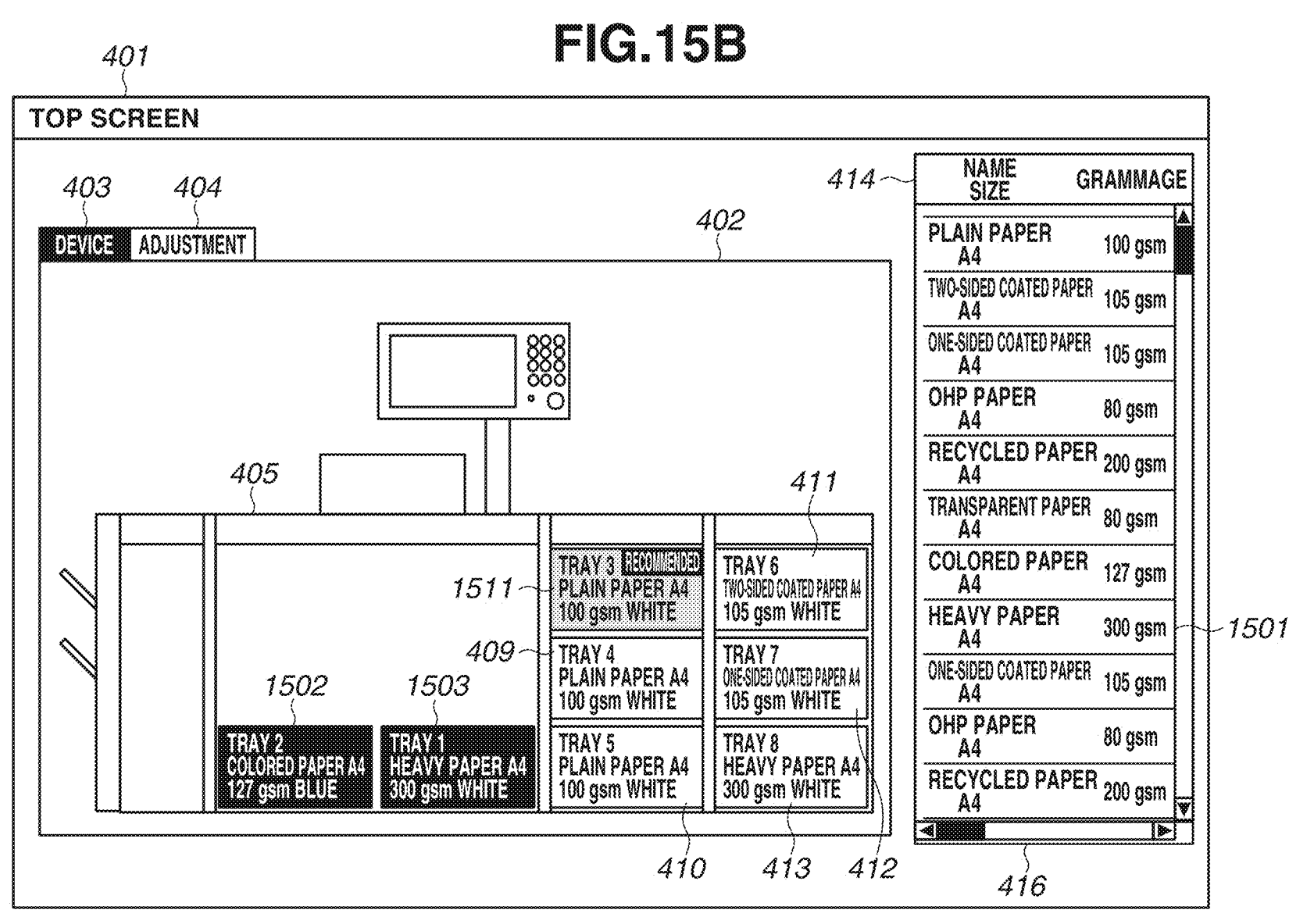

FIG. 15B illustrates a screen of the paper management application which is displayed on the display device 113 in the second exemplary embodiment. In an example of the screen illustrated in FIG. 15B, when paper information "heavy paper A4" 1501 has been selected from the paper list, paper feed trays with respect to which the paper information is not able to be registered are grayed out, and a paper feed tray with respect to which the paper information is recommended to be registered is displayed. Elements 401 to 416 and 1501 to 1503 are the same as those described with reference to FIG. 7A and FIG. 15A, and are, therefore, omitted from description. In FIG. 15B, a case where paper information "heavy paper A4" was registered the last time with respect to the tray 3 is illustrated. In this instance, the paper feed tray screen display unit 706 performs displaying of "recommended" on the paper feed tray button 1511 according to the operator selecting "heavy paper A3" 1501 from the paper list. In this way, the operator is enabled to recognize that the paper feed tray with respect to which the selected paper information "heavy paper A3" is recommended to be registered is the tray 3.

Processing which the print control apparatus 102 performs to update displaying of the paper feed tray screen in the second exemplary embodiment is described with reference to the flowchart of FIG. 17. A program used for the print control apparatus 102 to perform processing illustrated in this flowchart is stored in the storage device 309 illustrated in FIG. 3, and is loaded onto the RAM 302 and executed by the CPU 301. The processing illustrated in the present flowchart is started in response to updating of the paper feed tray screen being requested in the above-mentioned step S1102 illustrated in FIG. 12.

Figure 17:
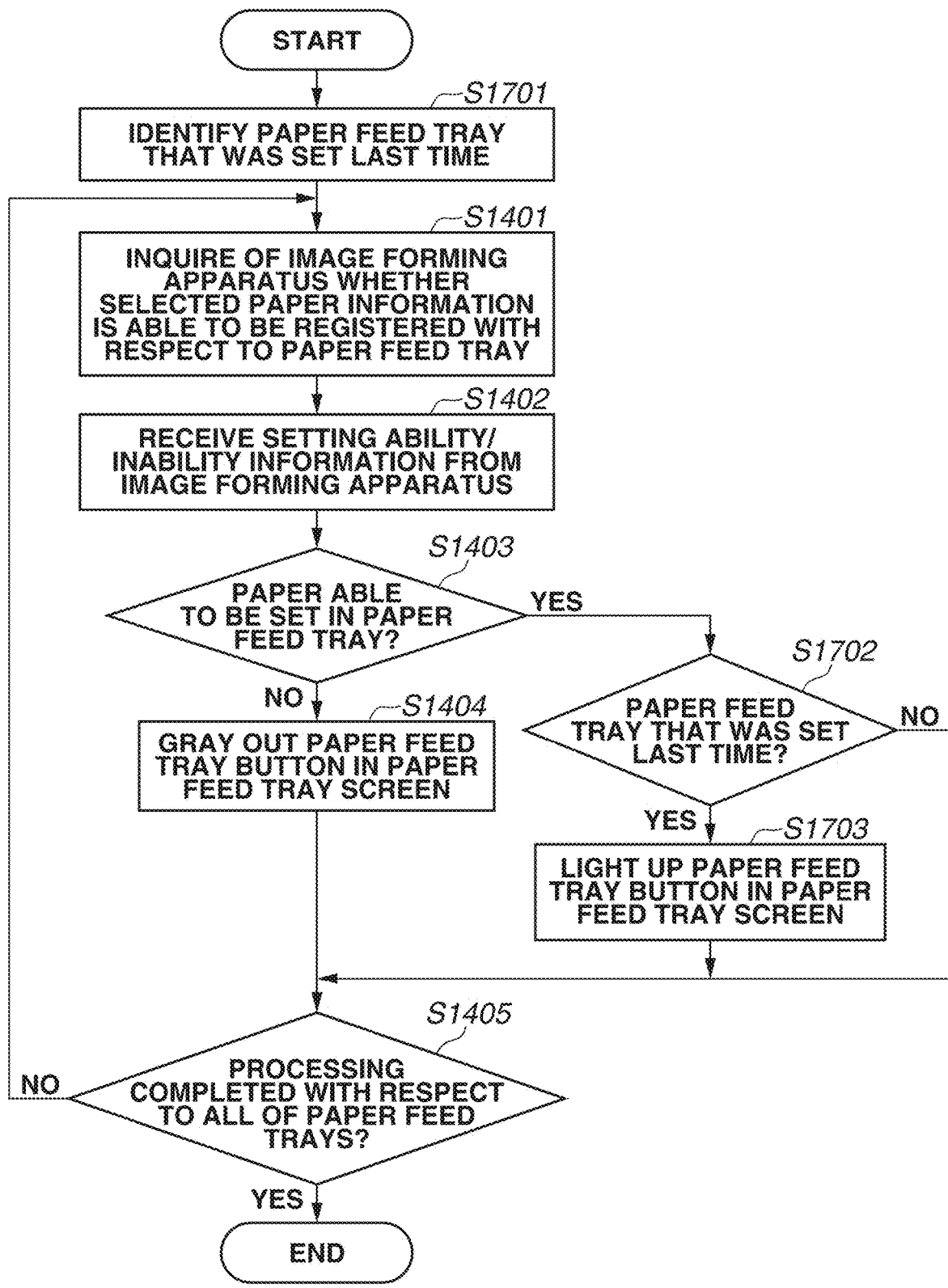
FIG. 17 is a flowchart illustrating paper feed tray screen update processing in a second exemplary embodiment.

Steps S1401 to S1405 illustrated in FIG. 17 are the same in processing content as steps S1401 to S1405 illustrated in FIG. 14, and are, therefore, omitted from description.

In step S1701, the paper feed tray information management unit 709 identifies with respect to which paper feed tray the paper information selected by the operator was registered the last time based on the paper registration history information 713. Although not illustrated in the paper registration history information 713 in FIG. 10, the paper registration history information 713 stores information indicating with respect to which paper feed tray each paper information was previously registered in time-series order.

In step S1702, the paper feed tray screen display unit 706 determines whether the tray 1 is the same as the paper feed tray identified in step S1701. If it is determined that the tray 1 is the same as the paper feed tray identified by the paper feed tray information management unit 709 in step S1701 (YES in step S1702), the print control apparatus 102 performs processing in step S1703 and subsequent steps, and, if not so (NO in step S1702), the print control apparatus 102 performs processing in step S1405 and subsequent steps.

If the paper feed tray identified in step S1701 and the tray 1 are the same (YES in step S1702), then in step S1703, the paper feed tray screen display unit 706 displays the paper feed tray button 406 of the tray 1 in a lighting-up manner so as to visually express recommending registration with respect to the tray 1. The print control apparatus 102 performs processing in steps S1402 to S1405 with respect to all of the paper feed trays.

In the second exemplary embodiment, when paper information has been selected by the operator, a paper feed tray with respect to which the selected paper information is not able to be registered is grayed out, and a paper feed tray with respect to which the selected paper information was registered the last time is displayed. In this way, the operator is enabled to recognize a paper feed tray with respect to which the selected paper information is not able to be registered and is also enabled to recognize a paper feed tray with respect to which the selected paper information is recommended to be registered. Registering the paper information with respect to the paper feed tray targeted for registration enables reducing the trouble of re-performing setting of adjustment items, such as "image position adjustment" and "curl correction".

In the description of the first exemplary embodiment, when the operator has selected paper information, the print control apparatus 102 grays out the paper feed tray button of a paper feed tray with respect to which the selected paper information is not able to be registered. However, in the first exemplary embodiment, the operator cannot recognize whether the grayed-out paper feed tray is a paper feed tray with respect to which the paper information is constantly unable to be registered or is a paper feed tray with respect to which the paper information is temporarily unable to be registered. The paper feed tray with respect to which the paper information is constantly unable to be registered is, for example, a paper feed tray which is not compatible with the selected paper size or a paper feed tray which is unable to appropriately convey the selected paper because of its high stiffness. On the other hand, the paper feed tray with respect to which the paper information is temporarily unable to be registered is, for example, a paper feed tray in which paper that is currently being used by the image forming apparatus 103 is set.

In a third exemplary embodiment, a paper feed tray with respect to which the paper information selected by the operator is temporarily unable to be registered and a paper feed tray with respect to which the paper information selected by the operator is constantly unable to be registered are displayed separately from each other.

Figure 15C:
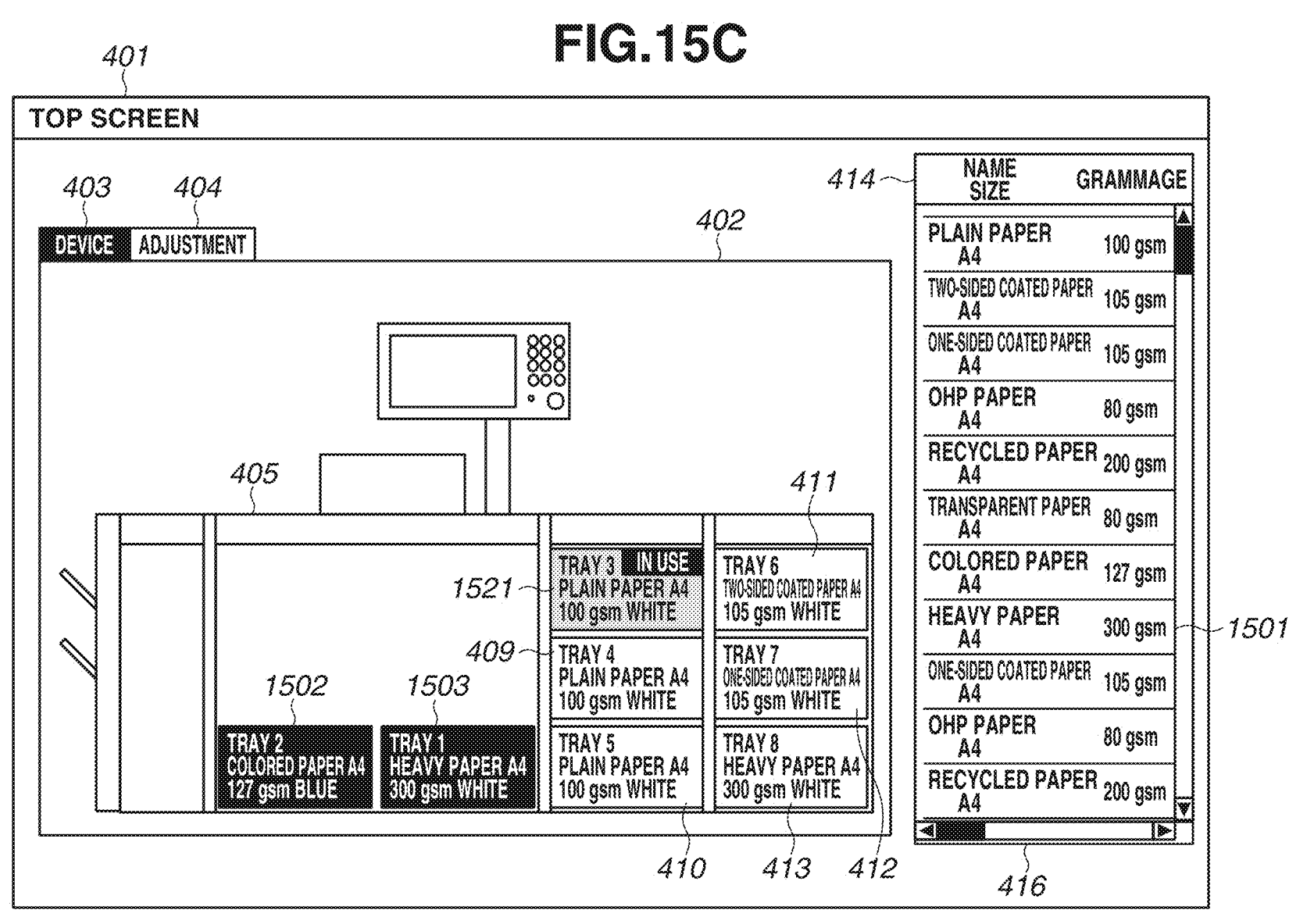

FIG. 15C illustrates an example of a screen displayed on the display device 113 when paper information "heavy paper A4" 1501 has been selected from the paper list. In FIG. 15C, a behavior in which printing is currently being performed with the use of the tray 3 in the image forming apparatus 103 is illustrated. In this instance, the paper feed tray screen display unit 706 displays a message "in use" as illustrated on the button 1521 of the tray 3.

Processing performed by the print control apparatus 102 in the third exemplary embodiment is described with reference to the flowchart of FIG. 18. A program used for the print control apparatus 102 to perform processing illustrated in this flowchart is stored in the storage device 309 illustrated in FIG. 3, and is loaded onto the RAM 302 and executed by the CPU 301. The processing illustrated in the present flowchart is started in response to updating of the paper feed tray screen being requested in the above-mentioned step S1103 illustrated in FIG. 12.

Figure 18:
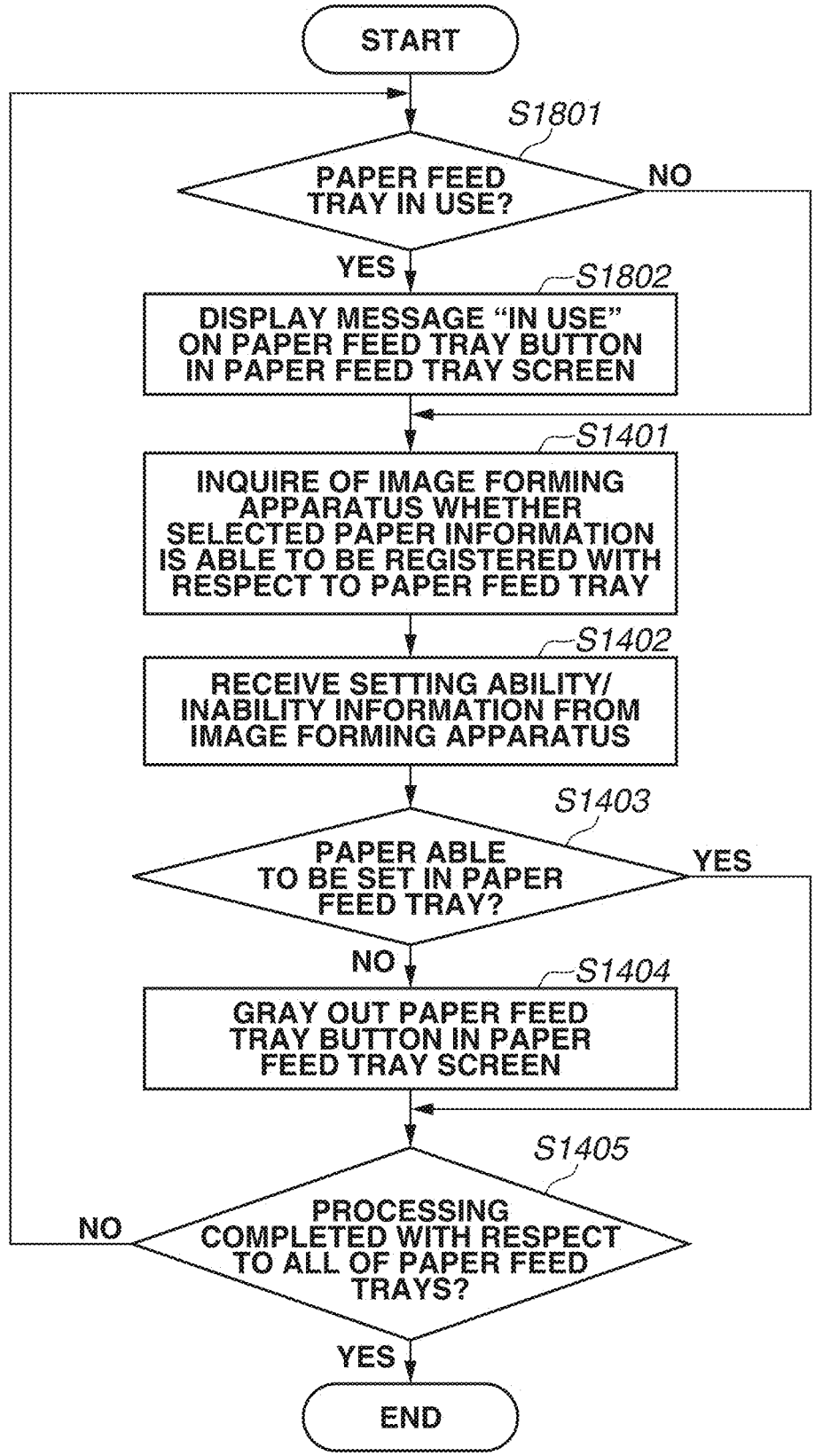
FIG. 18 is a flowchart illustrating paper feed tray screen update processing in a third exemplary embodiment.

Steps S1401 to S1405 illustrated in FIG. 18 are the same in processing content as steps S1401 to S1405 illustrated in FIG. 14, and are, therefore, omitted from description.

In step S1801, the paper feed tray information management unit 709 determines whether the tray 1 is in use for print processing. If it is determined that the tray 1 is in use for print processing (YES in step S1801), the print control apparatus 102 performs processing in step S1802, and, if it is determined that the tray 1 is not in use for print processing (NO in step S1801), the print control apparatus 102 performs processing in step S1401.

If it is determined that the tray 1 is in use for print processing (YES in step S1801), then in step S1802, the paper feed tray screen display unit 706 displays a message "in use" on the paper feed tray button 406 of the tray 1 displayed on the display device 113 so as to visually express the tray 1 being in use. The print control apparatus 102 performs processing in steps S1801 to S1802 and S1401 to S1405 with respect to all of the paper feed trays.

The second exemplary embodiment can be applied to the third exemplary embodiment, so that, besides displaying of the message "in use", a paper feed tray with respect to which the selected paper information is recommended to be registered can also be displayed.

In this case, from among paper feed trays with respect to which the paper information selected by the operator is not able to be registered, the operator can be notified of a paper feed tray with respect to which the paper information is temporarily unable to be registered because of, for example, being in use for printing. When selecting paper information about paper to be set in a paper feed tray, the operator can separately recognize a paper feed tray with respect to which the selected paper information is constantly unable to be registered and a paper feed tray with respect to which the selected paper information is able to be registered after completion of a currently-executed job.

In the case described in the first exemplary embodiment, when the operator has selected paper information, the print control apparatus 102 grays out a paper feed tray with respect to which the selected paper information is not able to be registered. In a fourth exemplary embodiment, when the operator has selected paper information, the operator is informed of a reason why the selected paper information is not able to be registered with respect to a paper feed tray. In this way, the operator can recognize why the selected paper information is not able to be registered with respect to a paper feed tray.

Figure 15D:
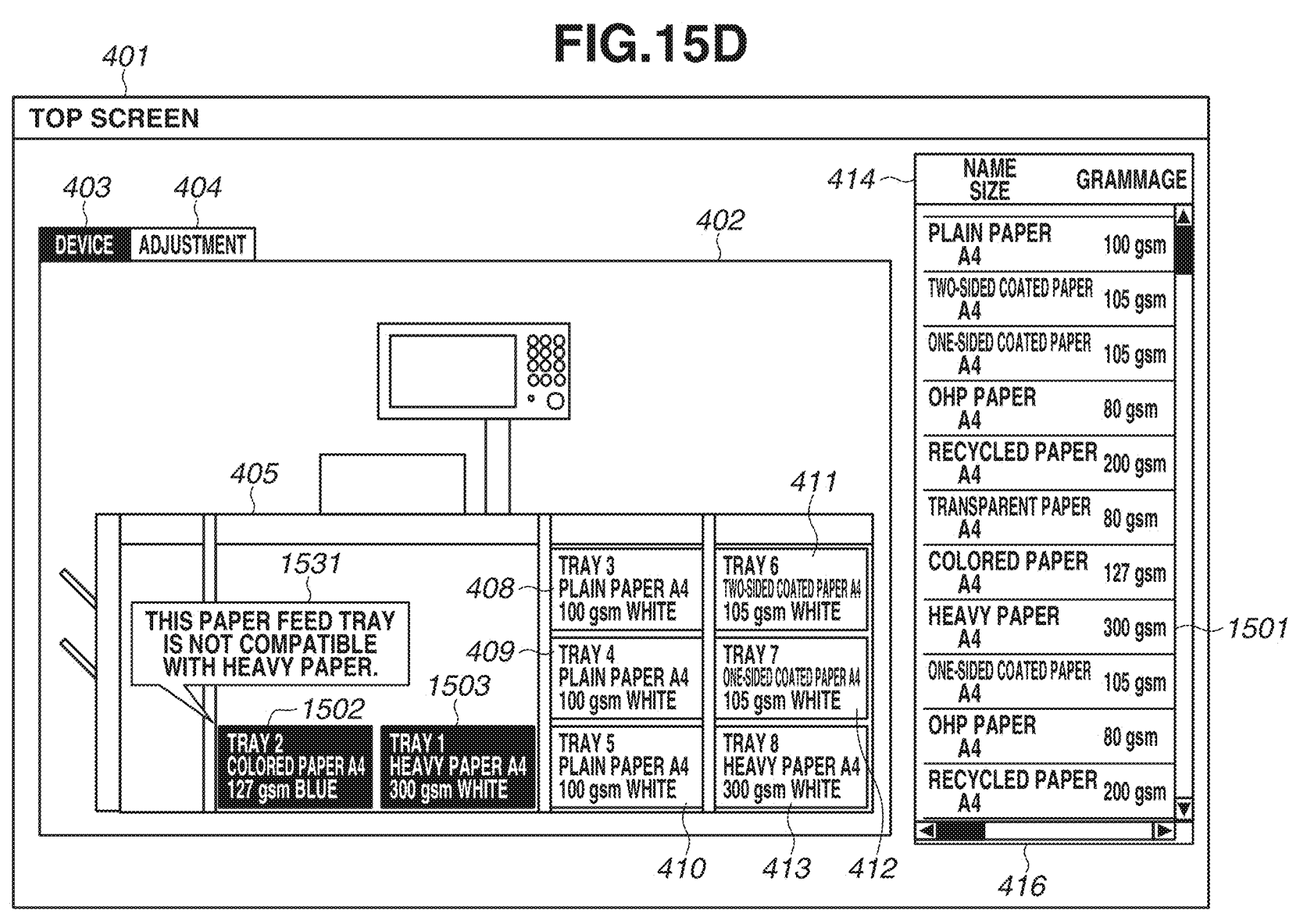

FIG. 15D illustrates a screen which is displayed on the display device 113 in the fourth exemplary embodiment. The screen illustrated in FIG. 15D is an example of a screen displayed when the operator presses paper information "heavy paper A4" 1501 included in the paper list and drags the pressed paper information to the paper feed tray button 1502. A region 1531 is displayed to indicate a reason why the paper information selected by the operator is unable to be registered with respect to the tray 2. Here, since the tray 2 is a paper feed tray in which heavy paper is not able to be set, a comment stating that "this paper feed tray is not compatible with heavy paper" is displayed. As an example of a message displayed when paper is not able to be set in a paper feed tray, if the paper feed tray is not compatible with non-standard sizes, for example, the reason that "this paper feed tray is not compatible with non-standard sizes" is displayed.

Processing performed by the print control apparatus 102 in the fourth exemplary embodiment is described with reference to the flowchart of FIG. 19. A program used for the print control apparatus 102 to perform processing illustrated in this flowchart is stored in the storage device 309 illustrated in FIG. 3, and is loaded onto the RAM 302 and executed by the CPU 301. The processing illustrated in the present flowchart is started in response to updating of the paper feed tray screen being requested in the above-mentioned step S1103 illustrated in FIG. 12.

Figure 19:
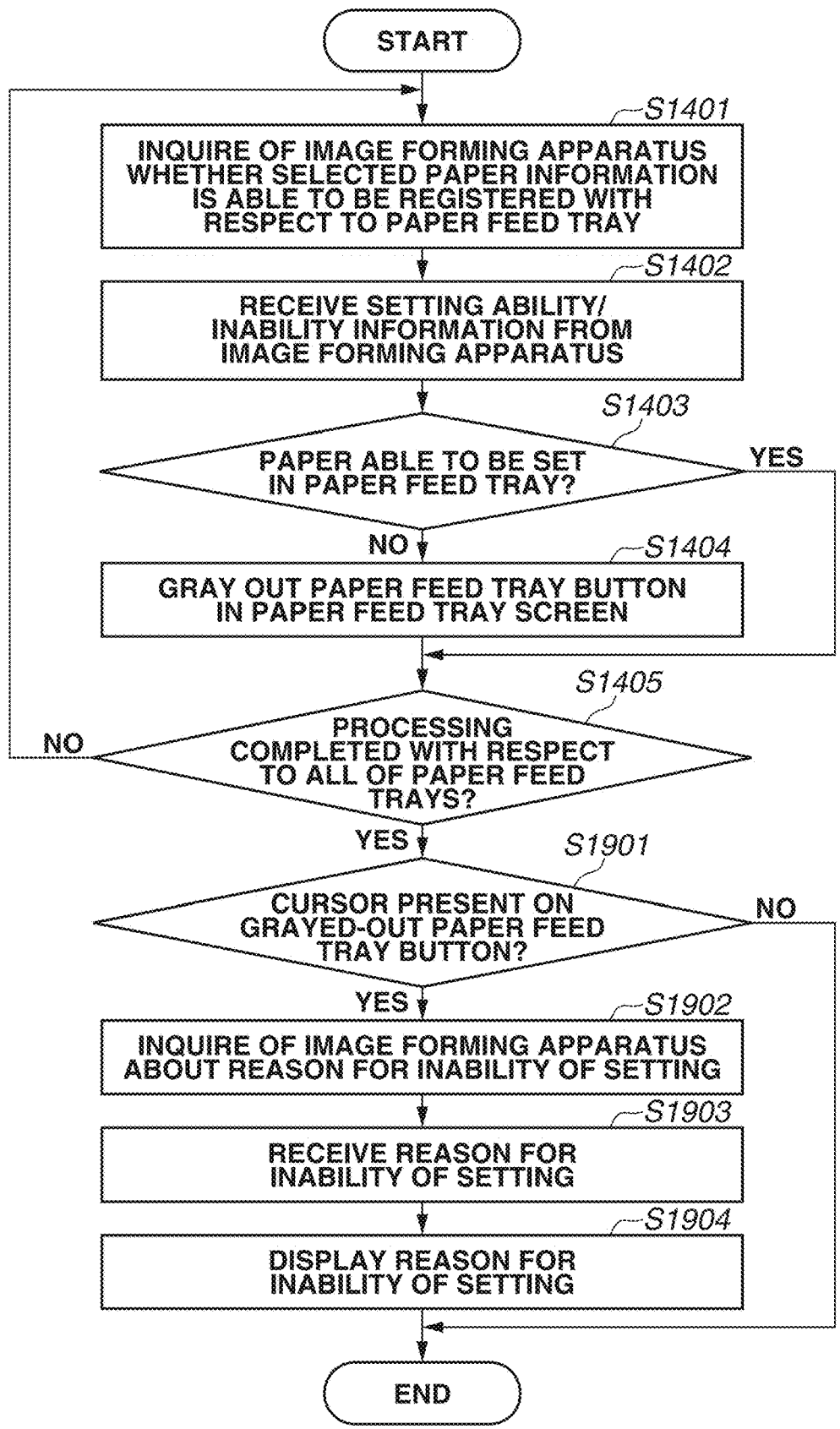
FIG. 19 is a flowchart illustrating paper feed tray screen update processing in a fourth exemplary embodiment.

Steps S1401 to S1405 illustrated in FIG. 19 are the same in processing content as steps S1401 to S1405 illustrated in FIG. 14, and are, therefore, omitted from description.

In step S1901, the detection unit 707 determines whether the position pointed to by the cursor of the mouse 115 is present on the paper feed tray button grayed out in step S1404. In the present exemplary embodiment, the cursor of the mouse 115 pointing to a paper feed tray is deemed to be the paper feed tray being selected. If it is determined that the position pointed to by the cursor of the mouse 115 is present on the grayed-out paper feed tray (YES in step S1901), the print control apparatus 102 performs processing in step S1902 and subsequent steps, and, if not so (NO in step S1901), the print control apparatus 102 ends the present processing.

If the cursor of the mouse 115 points to the grayed-out paper feed tray (YES in step S1901), then in step S1902, the paper setting ability/inability acquisition unit 708 inquires of the image forming apparatus 103 about the reason why the selected paper information is unable to be registered with respect to the paper feed tray.

In step S1903, the paper setting ability/inability acquisition unit 708 receives, from the image forming apparatus 103, the reason why the selected paper information is unable to be registered with respect to the paper feed tray. The reason why the selected paper information is unable to be registered with respect to the paper feed tray includes, for example, the paper feed tray not being compatible with a paper type indicated by the paper information and the paper feed tray not being compatible with a paper size indicated by the paper information.

In step S1904, the paper feed tray screen display unit 706 displays the reason received in step S1903 in the paper feed tray screen.

The second and third exemplary embodiments can be applied to the fourth exemplary embodiment. More specifically, both a paper feed tray which is in use for printing and a paper feed tray with respect to which the selected paper information is recommended to be registered can be displayed on the screen of the display device 113.

Implementing the fourth exemplary embodiment enables the operator to recognize why the selected paper information is unable to be set in the paper feed tray. The operator can refer to the displayed reason and can, for example, change paper to be used.

In the first to fourth exemplary embodiments, a case where, after the paper management application is started up, the operator selects paper information has been described. In a fifth exemplary embodiment, a case where the operator selects a paper feed tray button without selecting paper information after the paper management application is started up by the print control apparatus 102 is described. The paper list generation unit 711 generates a paper list in which pieces of paper information are arranged side by side in descending order of the number of times of registration with respect to the selected paper feed tray, based on the paper registration history information 713. In this instance, the selected paper feed tray can be a plurality of selected paper feed trays.

Figure 20:
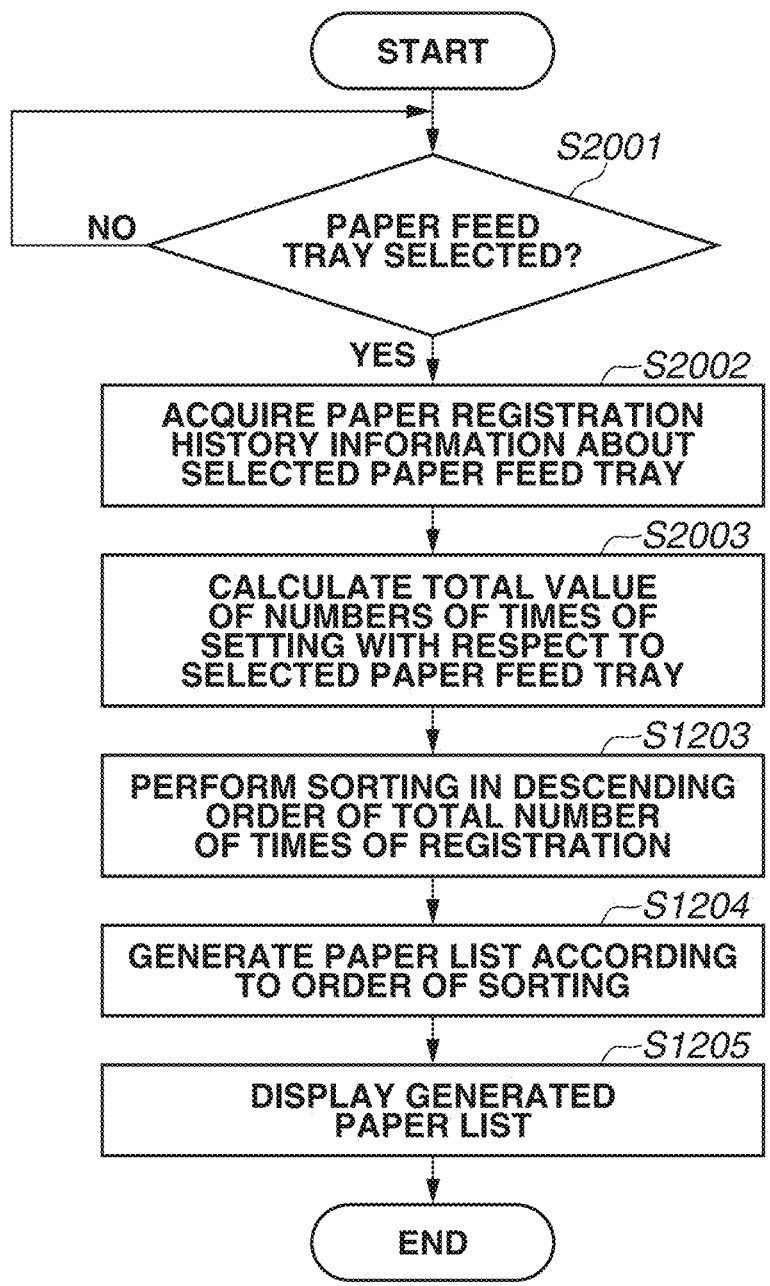
FIG. 20 is a flowchart illustrating paper list update processing in a fifth exemplary embodiment.

FIG. 20 is a flowchart illustrating processing performed by the print control apparatus 102 in the fifth exemplary embodiment. A program used for the print control apparatus 102 to perform processing illustrated in this flowchart is stored in the storage device 309 illustrated in FIG. 3, and is loaded onto the RAM 302 and executed by the CPU 301.

The processing illustrated in FIG. 20 is performed after the paper management application is started up by the print control apparatus 102 and the top screen of the paper management application is displayed.

In step S2001, the detection unit 707 determines whether any one of the paper feed tray buttons 406 to 413 in the top screen 401 of the paper management application has been selected. The paper feed tray button is selected by the operator pointing the cursor of the mouse 115 to the button of a paper feed tray to be selected and pressing the button of the mouse 115. If it is determined by the detection unit 707 that any one of the paper feed tray buttons 406 to 413 has been selected (YES in step S2001), the print control apparatus 102 performs processing in step S2002 and subsequent steps. If it is determined by the detection unit 707 that none of the paper feed tray buttons 406 to 413 has been selected (NO in step S2001), the detection unit 707 continues to wait for any one of the paper feed tray buttons 406 to 413 to be selected.

In step S2002, the paper list generation unit 711 acquires, from the paper registration history information 713 regarding the selected paper feed tray, the number of times the paper information was registered with respect to the selected paper feed tray.

In step S2003, the paper list generation unit 711 calculates the total value of the numbers of times of registration for the respective pieces of paper information based on the number of times of registration acquired in step S2002.

Steps S1203 to S1205 illustrated in FIG. 20 are the same operations as those of steps S1203 to S1205 illustrated in FIG. 13, and are, therefore, omitted from description.

After the print control apparatus 102 performs the processing illustrated in FIG. 20, the operator registers the paper information selected from the paper list with respect to the selected paper feed tray. At this time, as in the first exemplary embodiment, the paper feed tray information management unit 709 updates the paper feed tray information, and the paper feed tray screen display unit 706 updates the display content of the paper feed tray button that is being displayed.

FIG. 11B illustrates an example of a paper list generated in a state in which the tray 1 and the tray 3 have been selected. Pieces of paper information are sorted in descending order of the total value of the numbers of times of registration of paper information with respect to the tray 1 and the tray 3. While, in the present example, an operation performed when two paper feed trays are selected has been described, a similar processing operation can be naturally performed even when one paper feed tray is selected or three or more paper feed trays are selected.

In the description of the fifth exemplary embodiment, pieces of paper information stored in the paper database information 714 are arranged side by side and displayed in a list. In the fifth exemplary embodiment, only pieces of paper information that were previously registered with respect to the selected paper feed tray can be displayed as a paper list.

According to the fifth exemplary embodiment, when a paper feed tray is selected before paper information is selected, a paper list in which pieces of paper information are arranged in descending order of the number of times of registration with respect to the selected paper feed tray is generated and the paper feed tray screen is updated with the paper list. Therefore, a paper list in which the operator is enabled to easily search for paper information about paper that is frequently set in a specific paper feed ray with respect to which the operator intends to change registration can be displayed.

In the fifth exemplary embodiment, an operation performed when the operator selects a paper feed tray button after the paper management application is started up and the top screen 401 is displayed has been described. The case where the operator selects a paper feed tray without selecting paper information may be a case where the operator intends to change paper information that is registered with respect to the selected paper feed tray. Therefore, after selecting a paper feed tray button, the operator is unlikely to select the same paper information as the paper information displayed on the selected paper feed tray button from the paper list. Accordingly, in a sixth exemplary embodiment, in a case where the operator has selected a paper feed tray button without selecting paper information, paper information that is registered with respect to the selected paper feed tray button is prevented from being displayed on the paper list.

Figure 21:
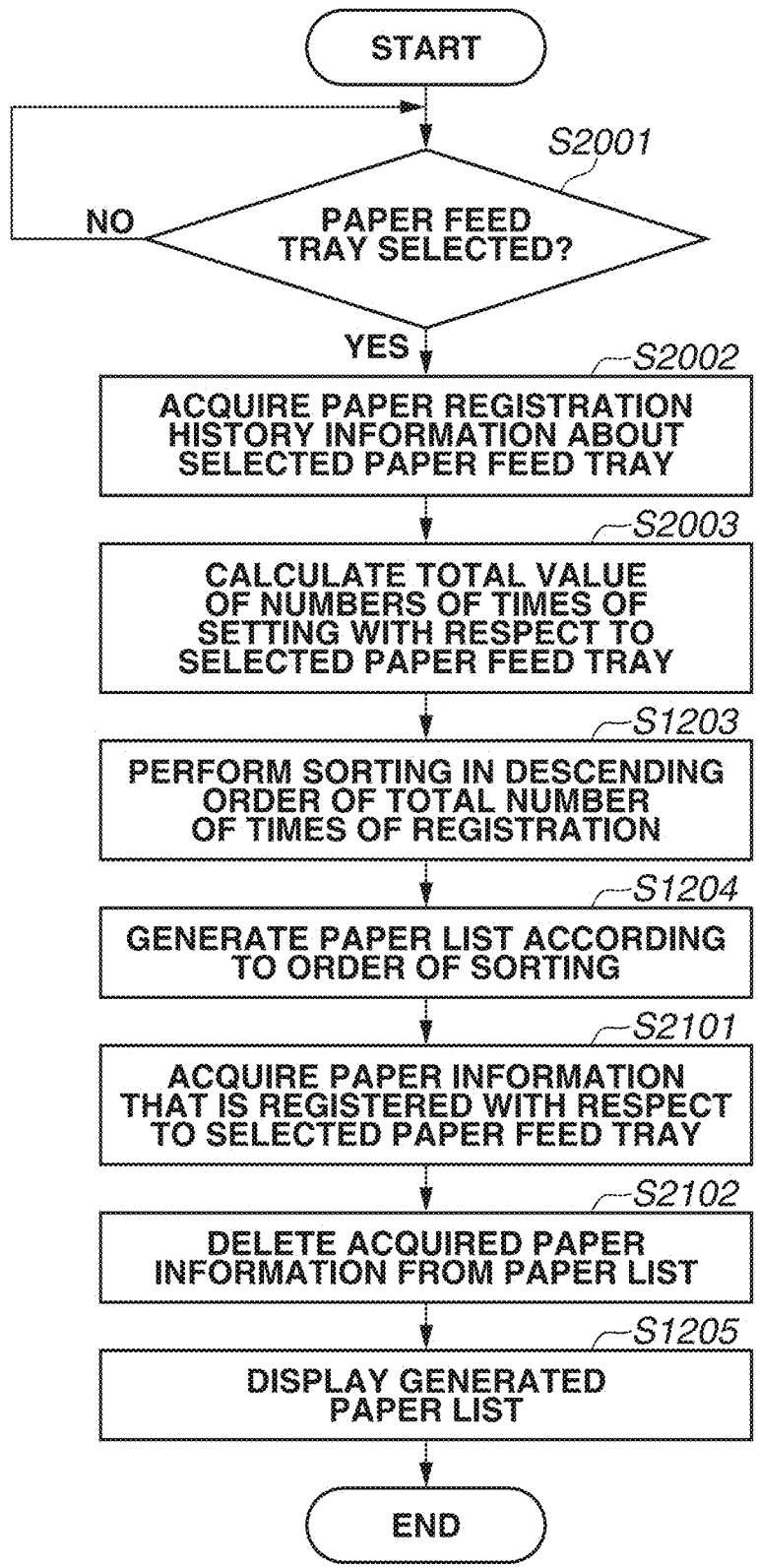
FIG. 21 is a flowchart illustrating paper list update processing in a sixth exemplary embodiment.

FIG. 21 is a flowchart illustrating processing performed by the print control apparatus 102 in the sixth exemplary embodiment. A program used for the print control apparatus 102 to perform processing illustrated in this flowchart is stored in the storage device 309 illustrated in FIG. 3, and is loaded onto the RAM 302 and executed by the CPU 301.

Steps S2001 to S2003 and S1203 to S1205 illustrated in FIG. 21 are the same processing operations as those of steps S2001 to S2003 illustrated in FIG. 20 and those of steps S1203 to S1205 illustrated in FIG. 13, and are, therefore, omitted from description.

In step S2101, the paper list generation unit 711 refers to paper feed tray information about the selected paper feed tray and acquires paper information that is currently registered with respect to the paper feed tray selected by the operator.

In step S2102, the paper list generation unit 711 eliminates the paper information acquired in step S2101 from the paper list generated in step S1204.

Processing which is performed after the paper list is displayed in the display portion of the display device 113 after the processing illustrated in FIG. 21 is completed is similar to that in the fifth exemplary embodiment, and is, therefore, omitted from description.

The fifth exemplary embodiment can be applied to the sixth exemplary embodiment. More specifically, a paper list in which pieces of paper information are arranged in descending order of the number of times of registration with respect to the selected paper feed tray can be displayed. Moreover, only pieces of paper information that were previously registered with respect to the selected paper feed tray can be displayed on a paper list.

In the sixth exemplary embodiment, paper information that is registered with respect to the paper feed tray selected by the operator is eliminated from the paper list. In this way, paper information can be displayed with the exception of paper information which the operator is unlikely to select from the paper list, and a greater number of pieces of paper information which the operator is likely to select can be displayed at a time.

In the description of the first exemplary embodiment, a paper list in which pieces of paper information are arranged side by side in descending order of the number of times of registration with respect to paper feed trays is generated. A seventh exemplary embodiment is configured to refer to the number of sheets of paper which were actually used for printing and to display pieces of paper information in order from paper information with the greater number of used sheets of paper on the paper list.

In the following description, only portions different from those of the first exemplary embodiment are described.

In the seventh exemplary embodiment, when the print job execution unit 904 executes a print job, the paper registration history information acquisition unit 909 of the image forming apparatus 103 refers to information about the executed print job and acquires paper information about the paper used for printing and the number of sheets of the paper used for printing. The data transmission and reception unit 905 of the image forming apparatus 103 transmits the acquired information to the print control apparatus 102.

The paper registration history information management unit 712 of the print control apparatus 102 stores the above-mentioned data received from the image forming apparatus 103 in the paper registration history information 713. This information is stored in the storage device 309, and is loaded onto the RAM 302 and used by the CPU 301. While the paper registration history information 713 has the same configuration as that illustrated in FIG. 10 and is, therefore, not illustrated, besides the number of times of registration of each piece of paper information, the number of sheets of each piece of paper used for printing is also stored as the paper registration history information 713.

Processing performed by the print control apparatus 102 in the seventh exemplary embodiment is similar to the processing illustrated in FIG. 13, and is, therefore, described with reference to FIG. 13. A program used for this processing is stored in the storage device 309, and is loaded onto the RAM 302 and executed by the CPU 301. Here, only processing different from that illustrated in FIG. 13 is extracted and described.

In step S1203, the paper list generation unit 711 refers to the column 803 in the paper registration history information 713 and sorts various pieces of paper information in descending order of the number of printed sheets with respect to all of the paper feed trays.

After the paper list is displayed, similar processing to those in the first to fourth exemplary embodiments is performed, and, therefore, the description thereof is omitted. In a case where a paper feed tray is selected after the paper list is displayed, displaying of the paper list can be updated according to the fifth and sixth exemplary embodiments.

The seventh exemplary embodiment is configured to store the number of sheets used for printing with respect to each paper feed tray as paper registration history information and to generate a paper list in which pieces of paper information are arranged in descending order of the number of printed sheets and display the paper list. This enables causing paper information about paper used for printing with a greater number of sheets thereof to appear higher up in display rankings on the paper list.

In the first and fifth to seventh exemplary embodiments, a paper list in which paper information with the greater number of times of registration with respect to paper feed trays appears higher up in display rankings is displayed in the paper list display region 414. An eighth exemplary embodiment is configured to display a paper list in which pieces of paper information stored in a paper database are permuted by the operator with respect to a selected item. This enables the operator to change the order of various types of paper displayed on the paper list as appropriate.

FIG. 22 illustrates an example of a UI used to perform registration with respect to displaying of a paper list in the eighth exemplary embodiment. The screen illustrated in FIG. 22 can be displayed by a predetermined operation being performed by the operator via a top screen of the paper management application. For example, a setting change button (not illustrated) is displayed in the top screen 401 illustrated in FIG. 7A or 7B, and the screen illustrated in FIG. 22 is displayed in response to the operator selecting the setting change button via the mouse 115. The UI screen illustrated in FIG. 22 is generated according to an instruction from the CPU 301, and is then displayed on the display device 113 by the UI control unit 701.

A screen 2201 is used to perform display setting of the paper list display region 414. A pull-down button 2202 is provided. When the operator selects the pull-down button 2202, options 2203 for a paper list display method are displayed.

Examples of the options 2203 for a paper list display method include "name", which means sorting by name of paper information, "registration", which means sorting in order of registration of paper information, "grammage", which means sorting in order of grammage of paper information, "number of times of registration", which means sorting in order of the number of times of registration, and "number of printed sheets", which means sorting in order of the number of printed sheets. Naturally, the options are not limited to these methods, but another method for changing the display order in the paper list, such as a method for sorting that is based on different paper attribute information, such as paper size or surface property, can be used as options. Moreover, the ascending order or descending order can be selected in arranging pieces of paper information with the item "name".

The operator selects one method from among the options 2203 and presses an OK button 2204. In response to the OK button 2204 being selected, the setting is stored. The paper list generation unit 711 generates a paper list according to the stored setting and displays the paper list in the paper list display region 414. When a cancel button 2205 is pressed, the setting is canceled and the screen illustrated in FIG. 22 is closed.

In the eighth exemplary embodiment, the case of changing the display order in the paper list has been described. Besides changing of the display order, pieces of paper information to be displayed as a paper list can be filtered before being displayed. For example, an option "frequently-registered paper" is additionally displayed in the options 2203. In a case where the operator selects this additional option and presses the OK button 2204, only a predetermined number (for example, ten types) of pieces of paper information with a greater number of times of registration with respect to paper feed trays can be displayed as a paper list. Processing performed after displaying of the paper list is similar to those in the first to fourth exemplary embodiments, and is, therefore, omitted from description. Moreover, in a case where a paper feed tray button is selected after displaying of the paper list, the fifth or sixth exemplary embodiment can be employed.

The eighth exemplary embodiment is configured to receive, from the operator, selection of the display order employed to display a list of paper information, and to display a paper list generated based on the selected display order received from the operator in the paper list display region 414. This enables permuting pieces of information on the paper list displayed in the paper list display region 414 according to the item selected by the operator. This will reduce the operator's trouble in searching for paper information about paper other than frequently used types of paper from the paper list. For example, permuting pieces of paper information in the "order of registration" enables facilitating searching for information about a recently registered type of paper.

The print control apparatus according to exemplary embodiments of the disclosure is able to display a list in which pieces of paper information are permuted based on the number of times the operator registers paper information with respect to paper feed trays.

Furthermore, in the first to fourth exemplary embodiments, examples of a display method for the paper feed tray screen have been described using gray-out, in-use indication, and lighting-up. Other examples of the display method include a method of distinguishing between paper feed tray buttons using blinking, non-display, or color change. In addition, as long as a method capable of distinguishing whether paper information is able to be registered is used, the aspect of the embodiments can be applied.

Moreover, the aspect of the embodiments can also be implemented by performing the following processing. Specifically, software (program) for implementing the functions of the above-described exemplary embodiments is supplied to a system or apparatus via a network or any type of storage medium, and a computer (alternatively, for example, a CPU or a micro processing unit (MPU)) of the system or apparatus reads and executes the program. In this case, the computer program and a storage medium storing the computer program each implement in the aspect of the embodiments.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-230825 filed Nov. 29, 2016, which is hereby incorporated by reference herein in its entirety.

What is claimed is:

1. An information processing apparatus capable of communicating with an image forming apparatus that performs printing using a recording medium set in a feeding unit of a plurality of feeding units, the information processing apparatus comprising:
   a controller including a processor that executes a program or a circuit, the controller being configured to function as:
   a unit that stores first count information indicating a number of times that a first type of the recording medium is set as a type of a recording medium which is stored in any one of the plurality of feeding units and second count information indicating a number of times that a second type of the recording medium is set as a type of a recording medium which is stored in any one of the plurality of feeding unit; and
   a unit that causes a display device to display a screen in which a first object and a second object are arranged in an order based on the first count information and the second count information,
   wherein the screen is displayed with a change in the order of arrangement of the first object and the second object when the order based on the first count information and the second count information is changed.

2. The information processing apparatus according to claim 1, wherein the controller performs sorting of the order of arrangement of the first object and the second object based on the first count information and the second count information.

3. The information processing apparatus according to claim 2, wherein the controller receives setting of changing a rule of the order of arrangement of a plurality of objects including the first object and the second object.

4. The information processing apparatus according to claim 3, wherein the order of arrangement includes one of an order of name of a type of a recording medium, an order of registration of a type of a recording medium, an order of grammage of a type of a recording medium, and an order of a number of times of registration of a type of a recording medium for a feeding unit.

5. The information processing apparatus according to claim 1, wherein a type of a recording medium includes at least one of paper name, paper type, paper size, and grammage.

6. The information processing apparatus according to claim 1,
wherein in a case where the first object is dragged and dropped onto a third object indicating one of the plurality of feeding units,
the first type of the recording medium is set as a type of a recording medium which is stored in the feeding unit corresponding to the third object.

7. The information processing apparatus according to claim 1,
wherein, in a case where a fourth object corresponding to a third type of a recording medium is selected via the screen to set the third type of the recording medium as a type of a recording medium which is stored in a specific feeding unit, the controller causes the display device to display a notice indicating that the third type of the recording medium is not able to be set as a type of a recording medium which is stored in the specific feeding unit.

8. The information processing apparatus according to claim 1, wherein, according to a type of a recording medium being selected and a feeding unit being selected, the controller causes the display device to give notice of a reason why the selected type of the recording medium is not able to be set in the selected feeding unit.

9. A setting method using an information processing apparatus capable of communicating with an image forming apparatus that performs printing using a recording medium set in a feeding unit of a plurality of feeding units, the setting method comprising:
storing first count information indicating a number of times that a first type of the recording medium is set as a type of a recording medium which is stored in any one of the plurality of feeding units and second count information indicating a number of times that a second type of the recording medium is set as a type of a recording medium which is stored in any one of the plurality of feeding unit; and
causing a display device to display a screen in which a first object and a second object are arranged in an order based on the first count information and the second count information,
wherein the screen is displayed with a change in the order of arrangement of the first object and the second object when the order based on the first count information and the second count information is changed.

10. The setting method according to claim 9,
wherein the setting method further comprises performing sorting of the order of arrangement of the first object and the second object based on the first count information and the second count information.

11. The setting method according to claim 10, further comprising receiving setting of changing a rule of the order of arrangement of a plurality of objects including the first object and the second object.

12. The setting method according to claim 11, wherein the order of arrangement includes one of an order of name of a type of a recording medium, an order of registration of a type of a recording medium, an order of grammage of a type of a recording medium, and an order of a number of times of registration of a type of a recording medium for a feeding unit.

13. The setting method according to claim 9, wherein a type of a recording medium includes at least one of paper name, paper type, paper size, and grammage.

14. The setting method according to claim 9, wherein in a case where the first object is dragged and dropped onto a third object indicating one of the plurality of feeding units, the first type of the recording medium is set as a type of a recording medium which is stored in the feeding unit corresponding to the third object.

15. The setting method according to claim 9, wherein, in a case where a fourth object corresponding to a third type of a recording medium is selected via the screen to set the third type of the recording medium as a type of a recording medium which is stored in a specific feeding unit, causing the display device to display a notice indicating that the third type of the recording medium is not able to be set as a type of a recording medium which is stored in the specific feeding unit.

16. The setting method according to claim 9, further comprising, according to a type of a recording medium being selected and a feeding unit being selected, causing the display device to give notice of a reason why the selected type of the recording medium is not able to be set in the selected feeding unit.

* * * * *